(12) United States Patent
Bhutani et al.

(10) Patent No.: US 11,785,641 B2
(45) Date of Patent: Oct. 10, 2023

(54) CONTROL DEVICE HAVING AN ADAPTIVE TRANSMISSION THRESHOLD

(71) Applicant: Lutron Technology Company LLC, Coopersburg, PA (US)

(72) Inventors: Ankit Bhutani, Aston, PA (US); Richard S. Camden, Coopersburg, PA (US); Robert C. Newman, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 54 days.

(21) Appl. No.: 17/334,111

(22) Filed: May 28, 2021

(65) Prior Publication Data

US 2021/0378008 A1 Dec. 2, 2021

Related U.S. Application Data

(60) Provisional application No. 63/032,024, filed on May 29, 2020.

(51) Int. Cl.
*H04W 74/08* (2009.01)
*H04B 17/318* (2015.01)

(52) U.S. Cl.
CPC ...... *H04W 74/0808* (2013.01); *H04B 17/318* (2015.01)

(58) Field of Classification Search
CPC .............................. H04W 72/08; H04W 84/18
See application file for complete search history.

(56) References Cited

U.S. PATENT DOCUMENTS

| | | | |
|---|---|---|---|
| 7,391,297 B2 | 6/2008 | Cash et al. | |
| 8,009,042 B2 | 8/2011 | Steiner et al. | |
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 8,950,461 B2 | 2/2015 | Adams et al. | |
| 9,488,000 B2 | 11/2016 | Krby et al. | |
| 10,264,651 B2 | 4/2019 | Steiner | |
| 2006/0009161 A1* | 1/2006 | Beecher ................ | H04W 28/18 455/67.11 |
| 2007/0286122 A1* | 12/2007 | Fonseca .............. | H04L 43/0894 370/329 |
| 2008/0092075 A1 | 4/2008 | Jacob et al. | |

(Continued)

*Primary Examiner* — Jamal Javaid
*Assistant Examiner* — Ryan C Kavleski
(74) *Attorney, Agent, or Firm* — Flaster Greenberg, P.C.

(57) ABSTRACT

Wireless devices may perform modified carrier sense multiple access (CSMA) techniques in order to increase reliability while maintaining a reasonable latency for communications. The wireless devices may perform listen-before-talk (LBT) techniques using an adaptive transmission threshold (e.g., an adaptive CSMA threshold). The transmission threshold may be compared to a measured signal strength magnitude to determine whether the frequency channel is quiet enough for transmission of a packet. The transmission threshold may be initially set to equal a minimum value. The wireless device may increase the transmission threshold after each instance of LBT failure to allow the wireless device to get progressively more likely to transmit the packet each time LBT fails.

26 Claims, 12 Drawing Sheets

(56) References Cited

U.S. PATENT DOCUMENTS

| | | |
|---|---|---|
| 2012/0286940 A1 | 11/2012 | Carmen, Jr. et al. |
| 2013/0030589 A1 | 1/2013 | Pessina et al. |
| 2014/0265568 A1 | 9/2014 | Crafts et al. |
| 2015/0163824 A1* | 6/2015 | Krzymien ............ H04B 17/382 |
| | | 370/338 |
| 2018/0167547 A1 | 6/2018 | Casey et al. |
| 2018/0176890 A1* | 6/2018 | Moon .................... H04L 1/203 |
| 2021/0279031 A1* | 9/2021 | van Erven .............. G06F 3/165 |

* cited by examiner

CONTROL DEVICE HAVING AN ADAPTIVE TRANSMISSION THRESHOLD

CROSS-REFERENCE TO RELATED APPLICATIONS

This application claims the benefit of U.S. Provisional Patent App. No. 63/032,024, filed May 29, 2020, entitled CONTROL DEVICE HAVING AN ADAPTIVE TRANSMISSION THRESHOLD, the disclosure of which is incorporated herein by reference in its entirety.

BACKGROUND

Lighting control systems may include lighting fixtures that include lighting loads, such as electrical lighting control devices or light emitting diodes, for lighting a space. These lighting fixtures may include a lighting control device, such as a light-emitting diode (LED) driver or electrical ballast, for controlling electrical power to the lighting load. The lighting control system may also include a system controller, or hub, that is capable of sending instructions to the lighting control devices for controlling the electrical power provided to the lighting load. The system controller may send the instructions to the lighting control devices via wireless communication.

There may be many wireless devices (e.g., lighting control devices, load control devices, mobile devices, and/or system controllers) within a given space. For example, in an office building with multiple floors, there may be a system controller for each floor. Each system controller may communicate with multiple lighting control devices on that floor. The system controllers may use the overlapping frequency channels. In addition, there may be other devices in the space that are using frequency channels that overlap with those of the system controllers. Consequently, there may be a relatively large amount of radio-frequency (RF) traffic on the frequency channels used by the system controllers. This may result in the lighting control devices failing to respond to instructions sent from the system controller, or the system controller failing to receive information about the state of the lighting control devices.

SUMMARY

Wireless devices (e.g., load control devices, input devices, mobile devices, and/or system controllers) may perform one or more techniques to increase the reliability of wireless communications in a network while maintaining a reasonable amount of latency. As described herein, a load control system may include load control devices for providing an amount of power to an electrical load. A control device, such as an input device, a system controller or another control device, may send messages including control information to the load control device (e.g., via wireless communication) for providing the amount of power to the electrical load. The load control devices may receive the messages via a communication circuit.

In certain situations, there may be multiple wireless devices using overlapping frequency channels within a relatively small space. For example, a building may have multiple floors, and each floor may have a system controller that controls a large number of lighting control devices. The system controllers on each floor and the associated lighting control devices may use overlapping frequency channels. In addition, there may be other devices (e.g., mobile devices, computers, appliances, wireless access points, etc.) using the same frequency channels. Further, there may be noise sources (e.g., microwaves, motors, security badge readers, etc.) that generate RF energy same frequency channels. There may be a relatively large amount of RF traffic (e.g., RF energy) on the frequency channels, and a consequently large amount of radio frequency interference (RFI). Radio frequency interference may cause the control devices of the load control system to drop packets sent from other control devices in the load control system, thereby decreasing reliability and increasing latency.

The control devices of the load control system may perform a modified carrier sense multiple access (CSMA) technique in order to increase reliability while maintaining a reasonable latency. For example, the control devices may perform a listen-before-talk (LBT) technique. When using the LBT technique, before sending a packet, a control device may measure a signal strength magnitude (e.g., a received signal strength indicator (RSSI) value) of RF traffic on a given frequency channel. A low value of the measured signal strength magnitude may indicate that the frequency channel is not being used by other control devices (e.g., the frequency channel is quiet), while a high value of the measured signal strength magnitude may indicate that the frequency channel is being used by other control devices (e.g., the frequency channel is occupied). The control device may compare the measured signal strength magnitude to a transmission threshold. If the measured signal strength magnitude is less than the transmission threshold, the control device may transmit the message. If the measured signal strength indicator is not less than the transmission threshold, the control device may wait for a predetermined period of time, and attempt to transmit again after the period of time has elapsed.

Performing CSMA techniques may increase the reliability of transmissions. However, the increase in reliability may come at the expense of latency. For example, if the number of control devices in the load control system is sufficiently large, the frequency channel may be occupied a relatively high percentage of the time, even if the control devices are performing the CSMA technique. There may be a relatively high chance that a given control device will measure a signal strength magnitude that is greater than the transmission threshold. Therefore, the control device may perform the CSMA technique many times before transmitting a message, thus increasing latency. For certain applications, it may be desirable to have a lower latency than can be achieved with the CSMA technique, while still maintaining increased reliability.

The control devices may perform a CSMA technique using an adaptive transmission threshold (e.g., an adaptive CSMA threshold). The control device may measure a signal strength magnitude (e.g., a present signal strength magnitude) of the frequency channel and compare the measured signal strength indicator to the transmission threshold to determine whether the frequency channel is "quiet" enough for transmission of a message. The transmission threshold may be initially set to equal a minimum threshold value. The control device may increase the transmission threshold after each instance of an LBT failure. For example, an LBT failure may occur when the measured signal strength magnitude on the frequency channel fails to be equal to or lower than the transmission threshold. In an example, the control device may increase (e.g., periodically increase) the transmission threshold by an increment (e.g., by a fixed amount, predefined amount, or variable amount) after each instance of LBT failure. Doing so may allow the control device to get progressively more likely to transmit the packet after each instance of LBT failure.

The control device may perform the CSMA technique using a maximum transmission threshold value. The control device may increase the transmission (e.g., by a fixed amount, predefined amount, or variable amount) after each instance of LBT failure. If the transmission threshold reaches or exceeds the maximum threshold value, the control device may transmit the message regardless of the measured signal strength magnitude continuing to exceed the transmission threshold. Alternatively, the control device may count a number of times that the measured signal strength magnitude is greater than the transmission threshold (e.g., the number of times that an LBT failure occurs), and transmit the message after a threshold number of times is reached. The control device may reset the transmission threshold and/or the counted number of times after transmission of the message.

The minimum threshold value and/or the maximum threshold value may be determined based on a priority context of the message. For example, the priority context of the message may be determined based on a type of the control device, a type and/or content of the message, a network role of the control device, and/or a network communication link associated with the message. The priority context may be, for example, latency-critical or latency non-critical. A latency-critical message may be a message for which noticeable or undue delay above a predefined threshold is unacceptable and/or undesirable. A latency non-critical message may be a message for which noticeable or undue delay above the predefined threshold is acceptable and/or allowed.

DETAILED DESCRIPTION

Figure 1A:
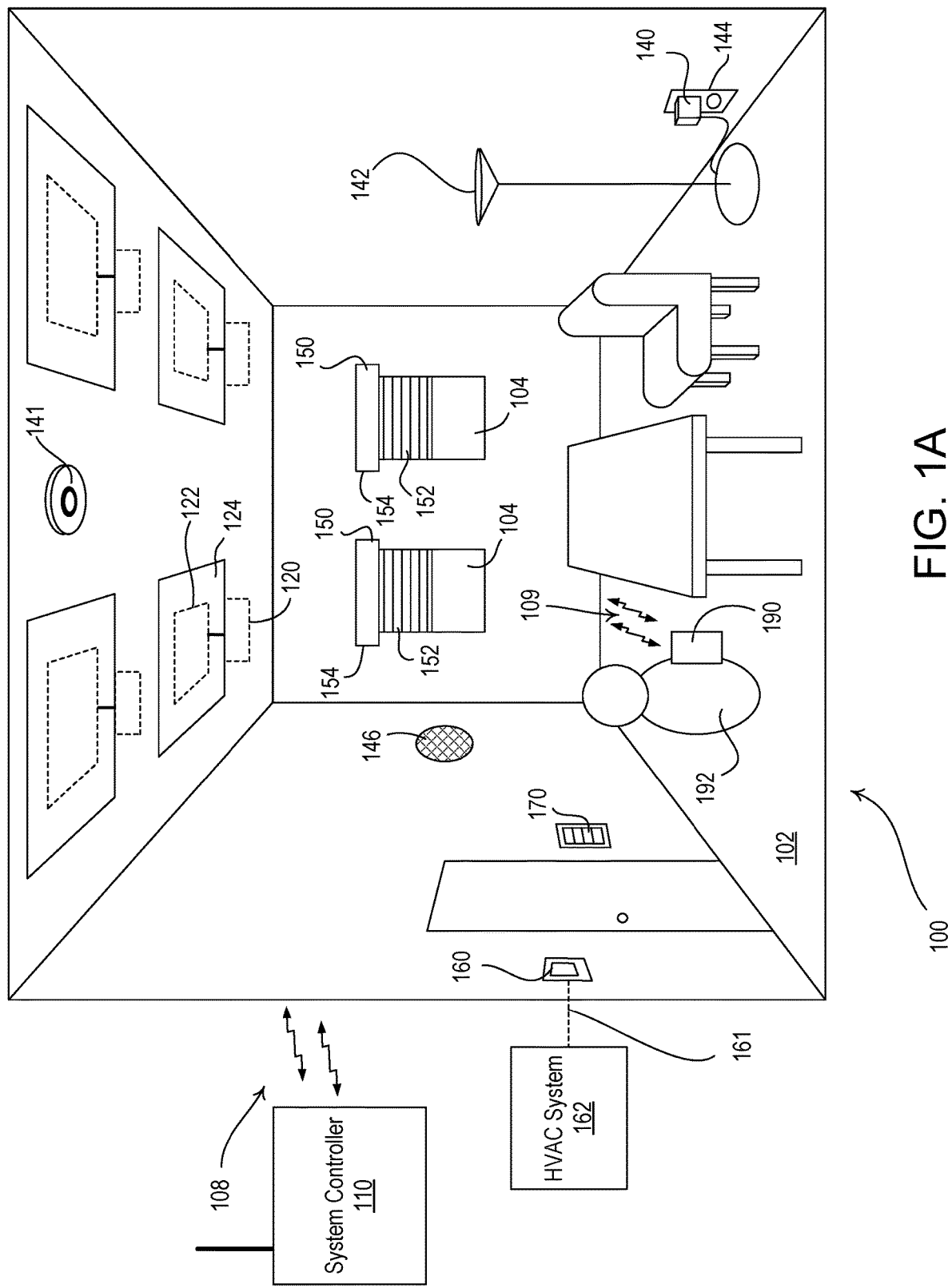
FIG. 1A is a diagram of an example load control system.

FIG. 1A is a diagram of an example load control system 100 for controlling the amount of power delivered from an alternating-current (AC) power source (not shown) to one or more electrical loads. The load control system 100 may be installed in a load control environment 102. The load control environment 102 may include a space in a residential or commercial building. For example, the load control system 100 may be installed in one or more rooms on one or more floors in the building.

The load control system 100 may comprise a plurality of control devices. The control devices may include load control devices that are configured to control one or more electrical loads in the load control environment 102 (also referred to as a user environment). For example, the load control devices may control the one or more electrical loads in response to input from one or more input devices or other devices in the load control system 100.

The load control devices in the load control system 100 may include lighting control devices. For example, the load control system 100 may include lighting control devices 120 for controlling lighting loads 122 in a corresponding lighting fixture 124. The lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device. Though an LED driver is provided as an example lighting control device, other types of lighting control devices may be implemented as load control devices in the load control system 100. For example, the load control system 100 may comprise dimmer switches, electronic dimming ballasts for controlling fluorescent lamps, or other lighting control devices for controlling corresponding lighting loads. The lighting control device 120 may be configured to directly control an amount of power provided to the lighting load 122. The lighting control device 120 may be configured to receive (e.g., via wired or wireless communications) messages via radio-frequency (RF) signals 108, 109 and to control the lighting load 122 in response to the received messages. One will recognize that lighting control device 120 and lighting load 122 may be integral and thus part of the same fixture or bulb, for example, or may be separate.

The load control devices in the load control system 100 may comprise one or more appliances that are able to receive the RF signals 108,109 (e.g., wireless signals) for performing load control. In an example, the load control system may include a speaker 146 (e.g., part of an audio/visual or intercom system), which is able to generate audible sounds, such as alarms, music, intercom functionality, etc. in response to RF signals 108, 109.

The load control devices in the load control system 100 may comprise one or more daylight control devices, e.g., motorized window treatments 150, such as motorized cellular shades, for controlling the amount of daylight entering the load control environment 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the load control environment 102. The motor drive units of the motorized window treatments 150 may be configured to receive messages via the RF signals 108 and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108, 109 and to turn on and off or adjust the intensity of the floor lamp 142 in response to the received messages.

The load control devices in the load control system 100 may comprise one or more temperature control devices, e.g., a thermostat 160 for controlling a room temperature in the load control environment 102. The thermostat 160 may be coupled to a heating, ventilation, and air conditioning (HVAC) system 162 via a control link 161 (e.g., an analog control link or a wired digital communication link). The thermostat 160 may be configured to wirelessly communicate messages with a controller of the HVAC system 162. The thermostat 160 may comprise a temperature sensor for measuring the room temperature of the load control environment 102 and may control the HVAC system 162 to adjust the temperature in the room to a setpoint temperature. The load control system 100 may comprise one or more wireless temperature sensors (not shown) located in the load control environment 102 for measuring the room temperatures. The HVAC system 162 may be configured to turn a compressor on and off for cooling the load control environment 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the load control environment 102. The thermostat 160 may be configured to receive messages via the RF signals 108, 109 and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle, or controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices capable of receiving an input event for controlling one or more load control devices in the load control system 100. The input devices and the load control devices may be collectively referred to as control devices in the load control system 100. The input devices in the load control system 100 may comprise one or more remote control devices, such as a remote control device 170. The remote control device may be battery-powered. The remote control device 170 may be configured to transmit messages via RF signals 108 to one or more other devices in the load control system 100 in response to an input event, such as an actuation of one or more buttons or a rotation of a rotary knob of the remote control device 170. For example, the remote control device 170 may transmit messages to the lighting control device 120, the plug-in load control device 140, the motorized window treatments 150, and/or the temperature control device 160 via the RF signals 108 in response to actuation of one or more buttons located thereon. The message may include control instructions and/or an indication of the actuation of one or more buttons for controlling a load control device in the load control system 100. The remote control device 170 may also communicate with other devices in the load control system 100 via a wired communication link. In response to an input event at the remote control device 170, a devices to which the remote control device 170 is wired may be triggered to transmit messages to one or more other devices in the load control system 100. The remote control device 170 may comprise a keypad. In another example, the remote control device 170 may comprise a rotary knob configured to transmit messages to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld. The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface event and/or in response to messages received that indicate the status of load control devices and/or electrical loads. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U S Patent Application Publication No. 2012/0286940, published Nov. 15, 2012, entitled CONTROL DEVICE HAVING A NIGHT-LIGHT, the entire disclosures of which are hereby incorporated by reference.

The input devices of the load control system 100 may comprise one or more sensor devices, such as a sensor device 141. The sensor device 141 may be configured to transmit messages via the RF signals 108 to one or more other devices in the load control system 100 in response to an input event, such as a sensor measurement event. The sensor device 141 may also or alternatively be configured to transmit messages via a wired communication link to one or more other devices in the load control system 100 in response to an input event, such as a sensor measurement event. The sensor device 141 may operate as an ambient light sensor or a daylight sensor and may be capable of performing a sensor measurement event by measuring a total light intensity in the space around the sensor device 141. The sensor device 141 may transmit messages including the measured light level or control instructions generated in response to the measured light level via the RF signals 108. Examples of RF load control systems having daylight sensors are described in greater detail in commonly assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY POWERED DAYLIGHT SENSOR, the entire disclosures of which are hereby incorporated by reference.

The sensor device 141 may operate as an occupancy sensor configured to detect occupancy and/or vacancy conditions in the load control environment 102. The sensor device 141 may be capable of performing the sensor measurement event by measuring an occupancy condition or a vacancy condition in response to occupancy or vacancy, respectively, of the load control environment 102 by the user 192. For example, the sensor device 141 may comprise an infrared (IR) sensor capable of detecting the occupancy condition or the vacancy condition in response to the presence or absence, respectively, of the user 192. The sensor device 141 may transmit messages including the occupancy conditions or vacancy conditions, or control instructions generated in response to the occupancy/vacancy conditions, via the RF signals 108. Again, the sensor device 141 may also or alternatively transmit messages including the occupancy conditions or vacancy conditions, or control instructions generated in response to the occupancy/vacancy conditions via a wired communication link. Examples of load control systems having occupancy and vacancy sensors are described in greater detail in commonly-assigned U.S. Pat. No. 8,228,184, issued Jul. 24, 2012, entitled BATTERY-POWERED OCCUPANCY SENSOR, U.S. Pat. No. 8,009,042, issued Aug. 30, 2011 Sep. 3, 2008, entitled RADIO-FREQUENCY LIGHTING CONTROL SYSTEM WITH OCCUPANCY SENSING, and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The sensor device 141 may operate as a visible light sensor (e.g., including a camera or other device capable of sensing visible light). The sensor device 141 may be capable of performing the sensor measurement event by measuring an amount of visible light within the load control environment 102. For example, the sensor device 141 may comprise a visible light sensing circuit having an image recording circuit, such as a camera, and an image processing circuit. The image processing circuit may comprise a digital signal processor (DSP), a microprocessor, a programmable logic device (PLD), a microcontroller, an application specific integrated circuit (ASIC), a field-programmable gate array (FPGA), or any suitable processing device capable of processing images or levels of visible light. The sensor device 141 may be positioned towards the load control environment 102 to sense one or more environmental characteristics in the load control environment 102. The image recording circuit of the sensor device 141 may be configured to capture or record an image. The image recording circuit of the sensor device 141 may provide the captured image to the image processor. The image processor may be configured to process the image into one or more sensed signals that are representative of the sensed environmental characteristics. The sensed environmental characteristics may be interpreted from the sensed signals by the control circuit of the sensor device 141 or the sensed signals may be transmitted to one or more other devices via the RF signals 108, 109 (e.g., a computing device in the load control environment) for interpreting the sensed environmental characteristics. For example, the sensed environmental characteristics interpreted from the sensed signals may comprise an occurrence of movement, an amount of movement, a direction of movement, a velocity of movement, a counted number of occupants, an occupancy condition, a vacancy condition, a light intensity, a color of visible light, a color temperature of visible light, an amount of direct sunlight penetration, or another environmental characteristic in the load control environment 102. In another example, the sensor device 141 may provide a raw image or a processed (e.g., preprocessed) image to one or more other devices (e.g., computing devices) in the load control system 100 for further processing. The sensor device 141 may operate as a color temperature sensor when sensing the color temperature of the visible light. Examples of load control systems having visible light sensors are described in greater detail in commonly-assigned U.S. Pat. No. 10,264,651, issued Apr. 16, 2019, entitled LOAD CONTROL SYSTEM HAVING A VISIBLE LIGHT SENSOR, and U.S. Patent App. Pub. No. 2018/0167547, published Jun. 14, 2018 entitled CONFIGURATION OF A VISIBLE LIGHT SENSOR, the entire disclosures of which are hereby incorporated by reference.

The sensor device 141 may be external to the lighting fixtures 124 (e.g., affixed or attached to a ceiling or a wall of the load control environment 102). The sensor device 141 may be positioned towards the load control environment 102 and may be capable of performing sensor measurement events in the load control environment 102. In one example, the sensor device 141 may be affixed or attached to a window 104 of the load control environment 102 and operate as a window sensor that is capable performing sensor measurement events on light that is entering the load control environment 102 through the window 104. For example, the sensor device 141 may comprise an ambient light sensor capable of detecting when sunlight is directly shining into the sensor device 141, is reflected onto the sensor device 141, and/or is blocked by external means, such as clouds or a building based on the measured light levels being received by the sensor device 141 from outside the window. The sensor device 141 may send messages indicating the measured light level. Though illustrated as being external to the lighting fixtures 124, one or more sensor devices 141 may be mounted to one or more of the lighting fixtures 124 (e.g., on a lower or outward-facing surface of the lighting fixture 124). For example, one or more sensor devices 141 may be electrically coupled to a control circuit or a load control circuit of the load control devices 120 for performing control in response to the sensor measurement events of the sensor devices 141.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The input devices and the load control devices may be configured to communicate messages between one another on a communication link within the load control system 100. The communication link between control devices in the load control system may comprise one or more network communication links through which messages may be transmitted for performing end-to-end communications in the load control system 100. For example, the input devices and the load control devices may be capable of communicating messages directly to one another via the RF signals 108. The RF signals 108 may be transmitted using a proprietary RF protocol, such as the CLEAR CONNECT protocol (e.g., CLEAR CONNECT TYPE A and/or CLEAR CONNECT TYPE X protocols) and/or a standard protocol, for example, one of WIFI, BLUETOOTH, BLUETOOTH LOW ENERGY (BLE), ZIGBEE, Z-WAVE, THREAD protocols, for a different protocol. In an example, the input devices may transmit messages to the load control devices via the RF signals 108 that comprise input events (e.g., button presses, sensor measurement events, or other input event) or control instructions generated in response to the input events for performing control of the electrical loads controlled by the load control devices. The input devices and the load control devices may be configured to communicate via the RF signals 108 on a first wireless communication link via a first wireless communication protocol (e.g., a wireless network communication protocol, such as THREAD, CLEAR CONNECT TYPE A, CLEAR CONNECT TYPE X, WIFI, etc.) and communicate via the RF signals 109 on a second wireless communication link via a second wireless communication protocol (e.g., a short-range wireless communication protocol, such as BLUETOOTH, BLE, etc.). Though communication links may be described as a wireless communication links, wired communication links may similarly be implemented for enabling communications herein.

For devices in the load control system 100 to recognize messages directed to the device and/or to which to be responsive, the devices may be associated with one another by performing an association procedure. For example, for a load control device to be responsive to messages from an input device, the input device may first be associated with the load control device. As one example of an association procedure, devices may be put in an association mode for sharing a unique identifier for being associated with and/or stored at other devices in the load control system 100. For example, an input device and a load control device may be put in an association mode by the user 192 actuating a button on the input device and/or the load control device. The actuation of the button on the input device and/or the load control device may place the input device and/or the load control device in the association mode for being associated with one another. In the association mode, the input device may transmit an association message(s) to the load control device (directly or through one or more other devices as described herein). The association message from the input device may include a unique identifier of the input device. The load control device may locally store the unique identifier of the input device in association information, such that the load control device may be capable of recognizing messages (e.g., subsequent messages) from the input device that may include load control instructions or commands. The association information stored at the load control device may include the unique identifiers of the devices with which the load control device is associated. The load control device may be configured to respond to the messages from the associated input device by controlling a corresponding electrical load according to the load control instructions received in the messages. The input device may also store the unique identifier of the load control device with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices for being associated. The system configuration data may comprise a load control dataset that defines the devices and operational settings of the load control system 100. The system configuration data may include information about the devices in the user environment 102 and/or the load control system 100, including configuration identifiers (e.g., fixture identifiers or load control device identifiers, groups, zones, areas, and/or location identifiers) of the control devices. For example, the system configuration data may include association information that indicates defined associations between devices in the load control system 100. The association information may be updated using any of the association procedures described herein.

One or more intermediary devices may also maintain association information that includes the unique identifiers that make up the associations of other devices in the load control system 100. For example, the input devices and the load control devices may communicate on a communication link in the load control system 100 through one or more other intermediary devices, such as router devices or other devices in a network. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may operable to communicate messages to and from the control devices (e.g., the input devices and the load control devices). For example, the system controller 110 may be configured to receive messages from the input devices and transmit messages to the load control devices in response to the messages received from the input devices. The system controller 110 may route the messages based on the association information stored thereon. The input devices, the load control devices, and the system controller 110 may be configured to transmit and receive the RF signals 108 and/or over a wired communication link. The system controller 110 may be coupled to one or more networks, such as a wireless or wired local area network (LAN), e.g., for access to the Internet. The system controller 110 may be wirelessly connected to the networks using one or more wireless protocols. The system controller 110 may be coupled to the networks via a wired communication link, such as a network communication bus (e.g., an Ethernet communication link).

The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol. The mobile device 190 and/or the system controller 110 may be capable of communicating on communication links with other devices via RF signals 108, 109.

The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user 192 to program how the load control system 100 will operate. For example, the configuration software may run as a PC application or a web interface. The configuration software and/or the system controller 110 (e.g., via instructions from the configuration software) may generate the system configuration data that may include the load control dataset that defines the operation of the load control system 100. For example, the load control dataset may include information regarding the operational settings of different load control devices of the load control system (e.g., the lighting control device 120, the plug-in load control device 140, the motorized window treatments 150, and/or the thermostat 160). The load control dataset may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS.

Figure 1B:
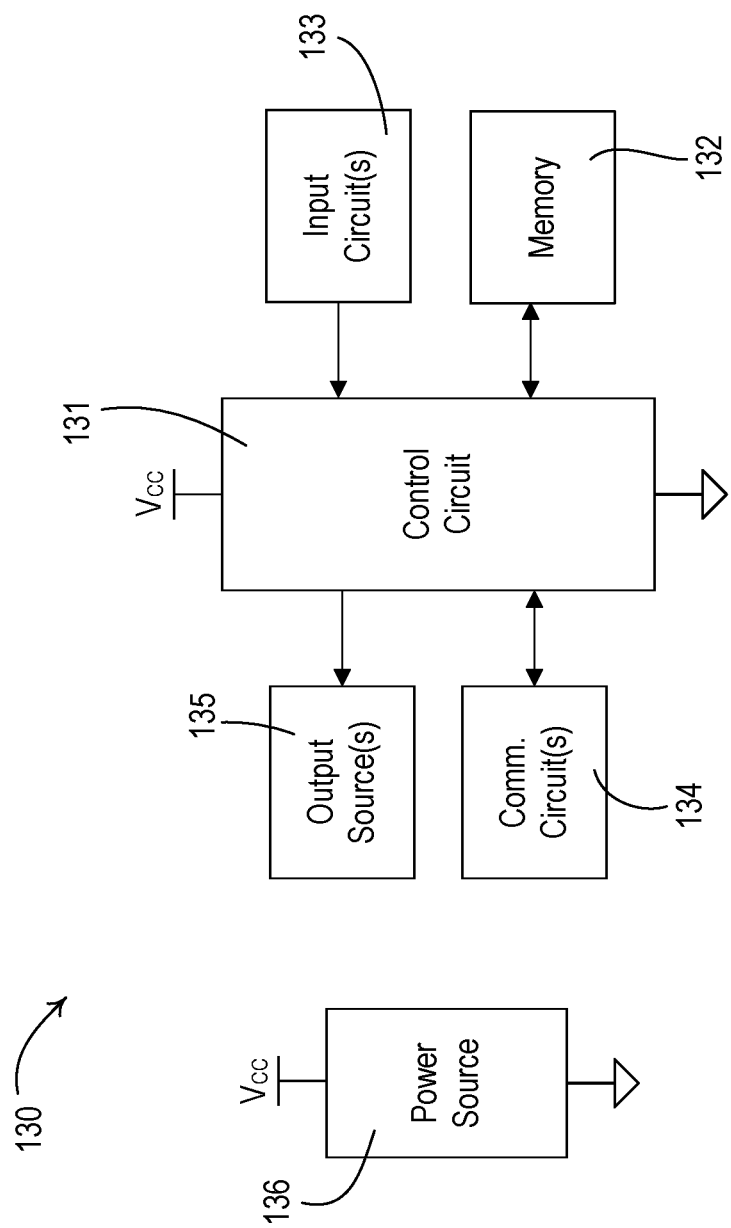
FIG. 1B is a block diagram illustrating an example of a device capable of processing and/or communication in the load control system of FIG. 1A.

FIG. 1B is a block diagram illustrating an example of a device 130 capable of processing and/or communication in a load control system, such as the load control system 100 of FIG. 1A. In an example, the device 130 may be a control device capable of transmitting or receiving messages. The control device may be in an input device, such as a sensor device 141 (e.g., an occupancy sensor or another sensor device), a remote control device 170, or another input device capable of transmitting messages to load control devices or other devices in the load control system 100. The device 130 may be a computing device, such as the mobile device 190, the system controller 110, a processing device, a central computing device, or another computing device in the load control system 100.

The device 130 may include a control circuit 131 for controlling the functionality of the device 130. The control circuit 131 may include one or more general purpose processors, special purpose processors, conventional processors, digital signal processors (DSPs), microprocessors, integrated circuits, a programmable logic device (PLD), application specific integrated circuits (ASICs), or the like. The control circuit 131 may perform signal coding, data processing, image processing, power control, input/output processing, or any other functionality that enables the device 131 to perform as one of the devices of the load control system (e.g., load control system 100) described herein.

The control circuit 131 may be communicatively coupled to a memory 132 to store information in and/or retrieve information from the memory 132. The memory 132 may comprise a computer-readable storage media or machine-readable storage media that maintains a device dataset of associated device identifiers, network information, and/or computer-executable instructions for performing as described herein. For example, the memory 132 may comprise computer-executable instructions or machine-readable instructions that include one or more portions of the procedures described herein. The procedures may enable the device 130 and/or other devices to perform one or more CSMA techniques using adaptive transmission thresholds, as described herein. The procedures may also enable the device 130 and/or other devices to determine background signal strengths, as described herein. The control circuit 131 may access the instructions from memory 132 for being executed to cause the control circuit 131 to operate as described herein, or to operate one or more other devices as described herein.

The memory 132 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 132 may be implemented as an external integrated circuit (IC) or as an internal circuit of the control circuit 131.

The device 130 may include one or more communication circuits 134 that are in communication with the control circuit 131 for sending and/or receiving information as described herein. The communication circuit 134 may perform wireless and/or wired communications. The communication circuit 134 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 130 receives power) using a power line carrier (PLC) communication technique. The communication circuit 134 may be a wireless communication circuit including one or more RF or infrared (IR) transmitters, receivers, transceivers, and/or other communication circuits capable of performing wireless communications.

Though a single communication circuit 134 may be illustrated, multiple communication circuits may be implemented in the device 130. The device 130 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, and the second communication circuit may be configured to communicate via a second wireless communication link (e.g., a short-range or direct wireless communication link) using a second wireless protocol (e.g., a short-range wireless communication protocol).

One of the communication circuits 134 may comprise a beacon transmitting and/or receiving circuit capable of transmitting and/or receiving beacon messages via a short-range RF signal. The control circuit 131 may communicate with beacon transmitting circuit (e.g., a short-range communication circuit) to transmit beacon messages. The beacon transmitting circuit may communicate beacons via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacons are transmitted (e.g., the beacon transmitting circuit is configured to transmit and receive beacon messages). The information received at the beacon transmitting circuit may be provided to the control circuit 131.

The control circuit 131 may be in communication with one or more input circuits 133 from which inputs may be received. The input circuits 133 may be included in a user interface for receiving inputs from the user. For example, the input circuits 133 may include an actuator (e.g., a momentary switch that may be actuated by one or more physical buttons) that may be actuated by a user to communicate user input or selections to the control circuit 131. In response to an actuation of the actuator, the control circuit 131 may enter an association mode, transmit association messages from the device 130 via the communication circuits 134, and/or receive other information (e.g., control instructions for performing control of an electrical load). In response to an actuation of the actuator, the control circuit may be configured to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 131 of the device 130 may enter the association mode, transmit an association message, transmit control instructions, or perform other functionality in response to an actuation or input from the user on the touch sensitive surface.

The input circuits 133 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 130). The control circuit 131 may receive information from the one or more input circuits 133 and process the information for performing functions as described herein.

The control circuit 131 may be in communication with one or more output sources 135. The output sources 135 may include one or more indicators (e.g., visible indicators, such as LEDs) for providing indications (e.g., feedback) to a user. The output sources 135 may include a display (e.g., a visible display) for providing information (e.g., feedback) to a user. The control circuit 131 and/or the display may generate a graphical user interface (GUI) generated via software for being displayed on the device 130 (e.g., on the display of the device 130).

The user interface of the device 130 may combine features of the input circuits 133 and the output sources 135. For example, the user interface may have buttons that actuate the actuators of the input circuits 133 and may have indicators (e.g., visible indicators) that may be illuminated by the light sources of the output sources 135. In another example, the display and the control circuit 131 may be in two-way communication, as the display may display information to the user and include a touch screen capable of receiving information from a user. The information received via the touch screen may be capable of providing the indicated information received from the touch screen as information to the control circuit 131 for performing functions or control.

Each of the hardware circuits within the device 130 may be powered by a power source 136. The power source 136 may include a power supply configured to receive power from an alternating-current (AC) power supply or direct-current (DC) power supply, for example. In addition, the power source 136 may comprise one or more batteries. The power source 136 may produce a supply voltage $V_{CC}$ for powering the hardware within the device 130.

Figure 1C:
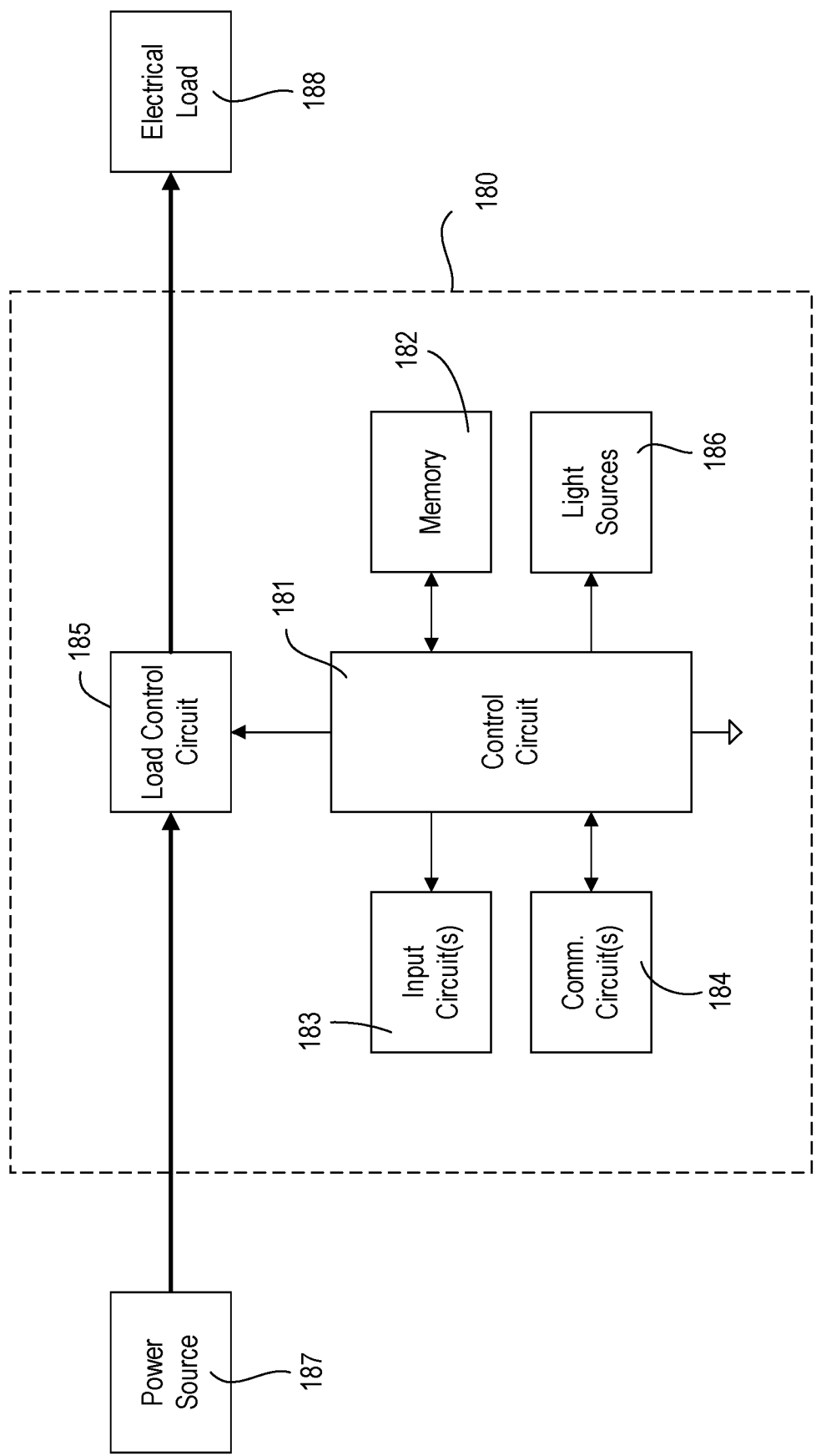
FIG. 1C is a block diagram illustrating an example load control device.

FIG. 1C is a block diagram illustrating an example load control device 180. The load control device 180 may be a lighting control device (e.g., the lighting control device 120), a motorized window treatment (e.g., the motorized window treatments 150), a plug-in load control device (e.g., the plug-in load control device 140), a temperature control device (e.g., the temperature control device 160), a dimmer switch, an electronic switch, an electronic ballast for lamps, and/or another load control device.

The load control device 180 may include a control circuit 181 for controlling the functionality of the load control device 180. The control circuit 181 may include one or more general purpose processors, special purpose processors, conventional processors, digital signal processors (DSPs), microprocessors, integrated circuits, a programmable logic device (PLD), application specific integrated circuits (ASICs), or the like. The control circuit 181 may perform signal coding, data processing, image processing, power control, input/output processing, or any other functionality that enables the load control device 180 to perform as one of the devices of the load control system (e.g., load control system 100) described herein.

The load control device 180 may include a load control circuit 185 that may be electrically coupled in series between a power source 187 (e.g., an AC power source and/or a DC power source) and an electrical load 188. The control circuit 181 may be configured to control the load control circuit 185 for controlling the electrical load 188, for example, in response to received instructions. The electrical load 188 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load. The electrical load may 188 be included in or external to the load control device 180. For example, the load control device 180 may be a dimmer switch or an LED driver capable of controlling an external lighting load. The electrical load 188 may be integral with the load control device 180. For example, the load control device 180 may be included in LEDs of a controllable light source, a motor of a motor drive unit, or a speaker in a controllable audio device.

The control circuit 181 may be communicatively coupled to a memory 182 to store information in and/or retrieve information from the memory 182. The memory 182 may comprise a computer-readable storage media or machine-readable storage media that maintains a device dataset of associated device identifiers, network information, and/or computer-executable instructions for performing as described herein. For example, the memory 132 may comprise computer-executable instructions or machine-readable instructions that include one or more portions of the procedures described herein. The procedures may enable the load control device 180 and/or other devices to perform one or more CSMA techniques using adaptive transmission thresholds, as described herein. The procedures may also enable the load control device 180 and/or other devices to determine background signal strengths, as described herein.

The control circuit 181 may access the instructions from memory 182 for being executed to cause the control circuit 181 to operate as described herein, or to operate one or more devices as described herein. The memory 182 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 182 may be implemented as an external integrated circuit (IC) or as an internal circuit of the control circuit 181.

The load control device 180 may include one or more communication circuits 184 that are in communication with the control circuit 181 for sending and/or receiving information as described herein. The communication circuit 184 may perform wireless and/or wired communications. The communication circuit 184 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 184 may be configured to communicate via power lines (e.g., the power lines from which the load control device 180 receives power) using a power line carrier (PLC) communication technique. The communication circuit 184 may be a wireless communication circuit including one or more RF or IR transmitters, receivers, transceivers, or other communication circuits capable of performing wireless communications.

Though a single communication circuit 184 may be illustrated, multiple communication circuits may be implemented in the load control device 180. The load control device 180 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol), and the second communication circuit may be configured to communicate via a second wireless communication link (e.g., a short-range or direct wireless communication link) using a second wireless protocol (e.g., a short-range wireless communication protocol).

One of the communication circuits 184 may comprise a beacon transmitting and/or receiving circuit capable of transmitting and/or receiving beacon messages via a short-range RF signal. A control circuit 181 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 181.

The control circuit 181 may be in communication with one or more input circuits 183 from which inputs may be received. The input circuits 183 may be included in a user interface for receiving inputs from the user. For example, the input circuits 183 may include an actuator (e.g., a momentary switch that may be actuated by one or more physical buttons) that may be actuated by a user to communicate user input or selections to the control circuit 181. In response to an actuation of the actuator, the control circuit 181 may enter an association mode, transmit association messages from the load control device 180 via the communication circuits 184, and/or receive other information. In response to an actuation of the actuator may perform control by controlling the load control circuit 185 to control the electrical load 188, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 181 of the load control device 180 may enter the association mode, transmit an association message, control the load control circuit 185, transmit control instructions, or perform other functionality in response to an actuation or input from the user on the touch sensitive surface.

The input circuits 183 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 180). The control circuit 181 may receive information from the one or more input circuits 183 and process the information for performing functions as described herein.

The control circuit 181 may illuminate a light sources 186 (e.g., LEDs) to provide feedback to a user. The control circuit 181 may be operable to illuminate the light sources 186 different colors. The light sources 186 may be illuminated by, for example, one or more light-emitting diodes (LEDs).

Referring again to FIG. 1A, a network may be used to facilitate communication between the respective devices (e.g., control devices) of the load control system 100. Control devices may communicate with each other via a network by first joining the network and then attaching to another control device on the network (e.g., to form a mesh network). When the lighting control system is initially installed, the control devices may join network (e.g., by exchanging credentials with a network commissioning device). The control devices may each then attempt to attach to another control device network to form the mesh network (e.g., formation of the network). In order to attach to another control device on the network, the control device may send and receive a number of messages via the network.

Figure 2A:
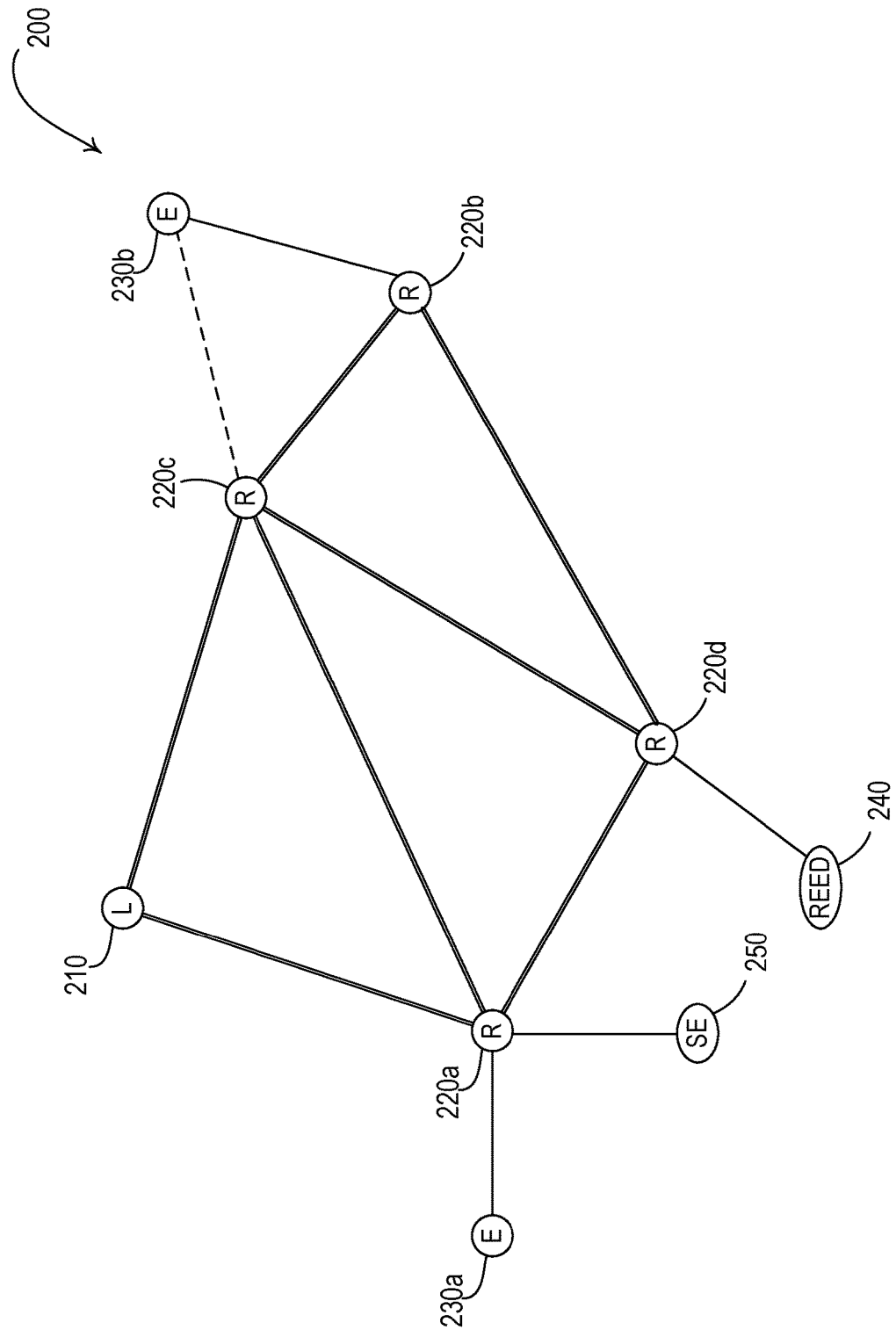
FIG. 2A is a diagram of an example network that may allow for communication between devices in the load control system of FIG. 1A.

FIG. 2A is an illustration of an example network 200 that may allow for communication between devices in a load control system (e.g., the load control system 100). The network 200 may include any suitable network to facilitate communications in a load control system or an Internet of Things (IoT) environment. The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more devices or less devices than the network 200.

The circled nodes of FIG. 2A may represent devices that are attached to other devices on the network 200 (e.g., the various control devices of the load control system 100). A control device that is attached to at least one other control device on the network 200 may communicate with the other control devices (e.g., that are attached to another control device on the network 200). Communication within the network 200 may be facilitated by the network communication links (e.g., attachments) established within the network 200. Referring to FIG. 2A, the network communication links between the control devices may be indicated by lines (e.g., double solid lines, single solid lines, and single dashed lines) that connect the respective devices.

The control devices attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200.

As illustrated in FIG. 2A, the network 200 may include a leader device 210. The leader device 210 may manage other control devices attached to the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may facilitate communication (e.g., route and receives messages to and from) between the network 200 and other networks or network partitions. Referring to FIG. 1A, a system controller (e.g., the system controller 110 shown in FIG. 1A) may be an example of a leader device 210. In addition, a control device within a load control system that is capable of being assigned to the role of a router device may be assigned to the role of the leader device (e.g., a control device).

The network 200 may include one or more router devices 220a-220d. The leader device 210 may support and be attached to multiple router devices (e.g., more than 30 router devices). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another (e.g., as indicated by the double solid lines connecting the router devices 220a-220d). The router devices 220a-220d may be in communication with the leader device 210, either directly or through one or more other router devices (e.g., as indicated by the double solid lines connecting the leader device 210 to the router devices 220a and 220c). The router devices 220a-220d may receive and route messages to other devices on the network 200 (e.g., the end devices 230a, 230b, the router eligible end device 240, and/or the sleepy end device 250). For example, the router devices 220a-220d may receive/transmit messages between devices, or between each other for communicating messages received from an attached device to another device attached to another router device. Referring now to the load control system 100 of FIG. 1A, a control device that is, for example, externally powered (e.g., a control device that is not battery powered) may be assigned to the role of a router device, such as, the system controller 110 the lighting control device 120, the plug-in load control device 140, the motorized window treatments 150, and/or the thermostat 160.

Referring again to FIG. 2A, the network 200 may include one or more end devices 230a, 230b (e.g., full or minimal end devices). The end devices 230a, 230b may be attached to another device (e.g., a parent device, such as the leader device 210 or router devices 220a, 220b, 220c, 220d) on the network 200 and may transmit and/or receive messages via an attached router device 220a-220d. Though two end devices 230a, 230b are shown in FIG. 2A, and each is attached to different router devices, each router device 220a-220d may support multiple end devices (e.g., more than 500 end devices). Referring again to the system 100 shown in FIG. 1A, the system controller 110, input devices (e.g., the remote control device 170 and/or sensor device 141), and/or load control devices (e.g. the lighting control device 120, the plug-in load control device 140, the motorized window treatments 150, and/or the thermostat 160) may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via an attached router device 220d. As shown in FIG. 2A, the router eligible end device 240 may be one of the end devices that is attached to the router device 220d. Referring to FIG. 1A, the system controller 110, the lighting control device 120, the plug-in load control device 140, the motorized window treatments 150, and/or the thermostat 160 may be examples of the router eligible end device 240. A control device that is, for example, externally powered (e.g., a control device that is not battery powered) may be assigned to the role of a router eligible end device.

Referring to FIG. 2A, the network 200 may include the sleepy end device 250. Sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable their respective communication circuits in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery power devices may be examples of the sleepy end device 250.

The leader device 210 may update the roles (e.g., or confirm role updates) of the control devices communicating within the network 200, for example, based on changes to the network 200. In an example, a control device may be assigned to a certain role when the control device attaches to the network 200, and the leader device 210 may update the role of the control device based on changes in network conditions. Changes in network conditions may include: increased message traffic, attachment of other control devices, changes in signal strength, etc. Updates to the assigned role of a control device may be based on the capabilities of the control device. For example, the leader device 210 may update the role of a control device from a router eligible end device to a router device (e.g., as a router eligible end device is an end device that is eligible to perform the role of a router device). The leader device 210 may update the role of an end device (e.g., a router eligible end device) to a router device by assigning a router identifier (ID) to the control device.

The control devices attached to other devices on the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220a-220d may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by single solid lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may each be configured to transmit unicast messages to their respective parent device. The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device that the end device 230b is attached via a lookup table. As illustrated in FIG. 2A, multiple paths may exist to route messages over the network 200, and router device may identify the shortest path (e.g., lowest number of hops) to transmit messages to a respective device.

Child devices may each be configured to communicate with one or more auxiliary parent devices (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the dashed lines in FIG. 2A). A child device may receive unicast messages from its parent device (e.g., primary parent device). A child device may also receive multicast messages or broadcast messages from its parent device (e.g., primary parent device) and one or more auxiliary parent devices, which may increase the efficiency and reliability of child device receiving the messages. Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100 of FIG. 1A, an actuation of a button of the remote control device 170 may adjust the intensity of multiple lighting loads (e.g., the lighting load 122 and the floor lamp 142) and a message may be broadcasted to adjust the respective lighting loads. In addition, the control devices that receive the broadcast transmission may be configured to process and repeat the message in response to receiving the broadcast transmission.

As described herein, the network 200 shown in FIG. 2A may allow for communication between devices in a load control system (e.g., the load control system 100 shown in FIG. 1A). The end devices 230a, 230b may include load control devices and/or input devices that communicate with other devices in the load control system. For example, the end device 230a may communicate with another end device in the load control system via RF communications.

Referring now to FIG. 1A, the remote control device 170 may operate as an end device or a sleepy end device for communicating messages comprising indications of user input and/or control instructions for controlling another end device (e.g., the lighting control device 120, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices the network to route the messages to the other end device (e.g., the lighting control device 120, the plug-in load control device 140, the motorized window treatment 150, and/or the thermostat 160) for performing load control.

A control device may attach to another control device on a network or network partition (e.g., the network 200 shown in FIG. 2A) to enable the control device to communicate (e.g., transmit and/or receive messages) via the network. A control device may initiate attachment to a network by transmitting a parent request message to discover potential parent devices. A parent request message may be transmitted by a control device to discover and/or attach to a parent device (e.g., leader devices and/or router devices). A control device may multicast a parent request message, for example, to identify leader or router devices that are attached to a network that can act as a parent device of the control device.

Potential parent devices (e.g., the leader device 210 and/or the router devices 220 of the network 200) that receive a parent request message may respond by transmitting a parent response message. For example, potential parent devices that receive a parent request message may each unicast a parent response message to the end device that transmitted the parent request message. A parent response message may indicate that the leader or router device that transmits the parent response message is available to act as a parent device. Accordingly, a control device that transmits a parent request message may receive a plurality of response to the parent request message and determine a parent device to synchronize with based on the received parent response messages. The control device transmitting the attachment request message may identify the signal strength associated with the response messages and attempt attachment to the parent device having the strongest signal strength for the response message.

Figure 2B:
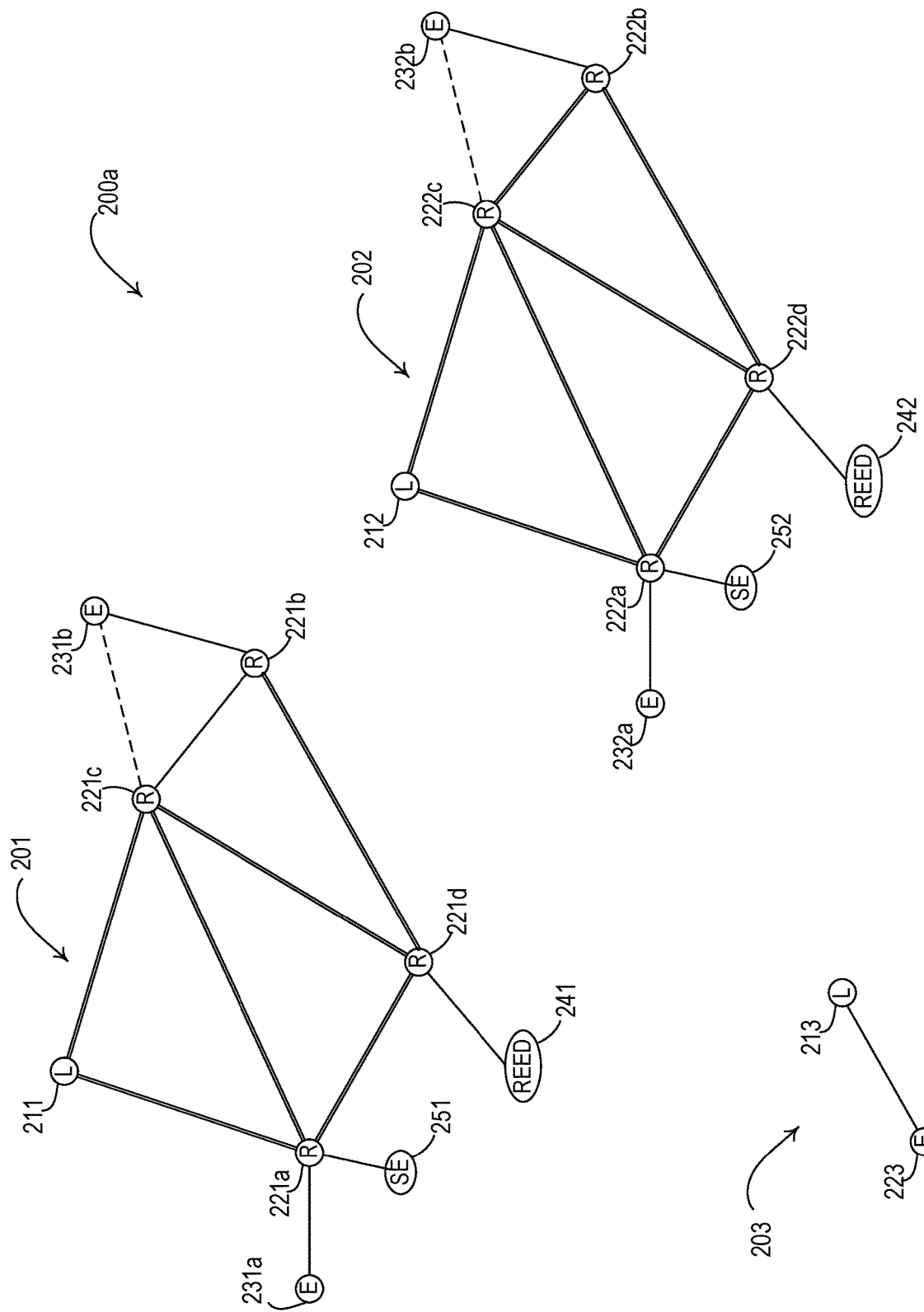
FIG. 2B is a diagram of example networks or network partitions (e.g., networks or sub-networks) that allow for communication between devices in the load control system of FIG. 1A.

FIG. 2B is an example illustration of a network 200a having a plurality of network partitions 201, 202, 203 (e.g., separate network partitions). As illustrated in FIG. 2B, the network partition 201 may include the following parent devices: a leader device 211 and router devices 221a, 221b, 221c, 221d. In addition, the network 201 may include child devices, such as: end devices 231a, 231b; router eligible end device 241; and sleepy end device 251. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between devices in a load control system (e.g., the load control system 100). In addition, the network partitions 201, 202, 203 may be formed as a result of certain devices being unable for attach to an already formed network partition. For example, as described herein, a control device may attempt to attach to a network partition by transmitting a parent request message. If, however, the control device fails to receive a response to the parent request message (e.g., because the control device is outside of a communication range of an already formed network partition), the control device may attempt to form its own network partition.

A control device that is unable to attach to a network partition may form another network partition. For example, referring to FIG. 2B, the leader device 213 may have been unable to attach to the network partitions 201, 202 (e.g., because the leader device 213 was outside of communication range of the network partitions 201, 202). Accordingly, the leader device 213 may form the network 203 and the end device 223 may attach to the network partition 203. Similarly, the leader device 212 may have been unable to attach to the network partitions 201, 203 (e.g., because the leader device 212 is outside of communication range of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). In addition, a higher priority value may indicate a higher network partition priority (e.g., then network partition 201 may be a higher priority network partition than the network partitions 202, 203).

As control devices attach to other control devices in each of the network partitions 201, 202, 203, the effective communication range of each of the network partitions may increase. In addition, control devices that were initially unable to attach to control devices in one or more of the network partitions 201, 202, 203 (e.g., because the control device was previously outside of the communication ranges of all of the network partitions), may subsequently be able to attach to control devices in one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a control device in a network partition may be unable to transmit messages to control devices attached to another network partition (e.g., a control device in a network partition may be unable to communicate with other control devices outside the network partition). Accordingly, if a control device attached to a control device in a first network partition is also within the communication range of a second network partition, the control device may attempt to detach from the control device in the first network partition and attach to a control device in the second network partition. For example, a control device may detach from the control device in the first network partition and attach to the control device in the second network partition when the priority of the second network partition is higher than the priority of the first network partition.

The router devices in each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the routers in the respective network (e.g., a summation of the communication range of each of the routers in the respective network). As a result, the communication range of a respective network or network partition may increase as the number of router devices in the respective network increases.

As described herein, the control devices attached to a control device in a lower-priority network partition may attempt to attach to a higher-priority network partition. For example, the control devices attached to a control device in the network partition 202 may attempt to attach to a control device the network partition 201 (e.g., as the network partition 201 has a priority value of 3 and the network partition 202 has a priority value of 1). The router device 222a may receive a partition advertisement message from a control device attached to a control device in the network partition 201 (e.g., from the router device 221d). The advertisement may include an indication of the partition identifier of the network 201 (e.g., 3) may be greater than the partition identifier of the network partition 202 and may indicate that the network partition 201 is a higher-priority network partition than the network 202. The router device 222a may determine to attach to a control device in the network partition 201 (e.g., as the network partition 201 has a higher priority).

The router device 222a may attempt to move to the network partition 201 by transmitting a request to the leader device of the network partition 201 (e.g., the leader device 211). The request may include a request to move to the network partition 201 as a router device, for example, by requesting to move to the network partition 201 and be assigned a certain router identifier. For example, the router device 222a may request to move to the network partition 201 and be assigned the router identifier that the router device 222a is assigned in the network partition 201. In response, the leader device 211 may reject the request if another router device 212a-212d attached to the network partition 210 is already assigned the requested router identifier. The leader device 211 may accept the request if none of the router devices 212a-212d attached to the network partition 201 are assigned the requested router identifier. If the router device 222a moves to the network partition 201 and assigned the requested router identifier, the child devices of the router device 222a (e.g., the end device 232a and the sleepy end device 252) may automatically move to the network partition 201. For example, as the child devices communicate with the router device 222a using the router identifier. If the router device 222a is assigned the requested identifier in the leader device 211 of the network partition 201 (e.g., the router identifier as assigned in the network partition 202), the child devices may continue to communicate with router device 222a using the same router identifier.

Figure 2C:
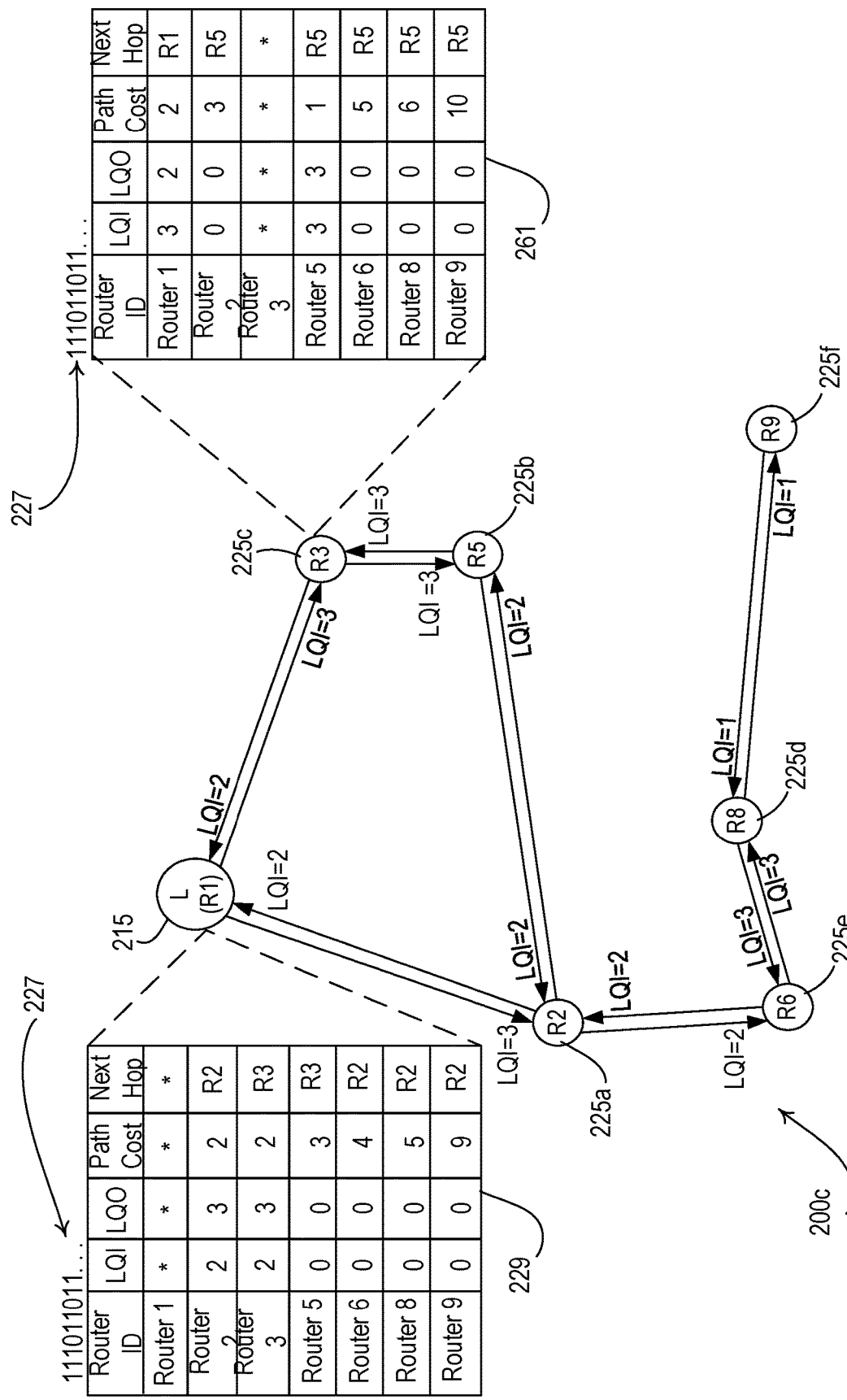
FIG. 2C is a diagram of another example network that illustrates the cost and network overhead associated with communication between the devices in the load control system of FIG. 1A.

FIG. 2C is an illustration of an example network 200c. As illustrated in FIG. 2C, the network 200c may include a leader device 215 and router devices 225a, 225b, 225c, 225d, 225e, 225f. In the network 200c, the router devices (e.g., the leader device 215 and router devices 225a, 225b, 225c, 225d, 225e, 225f) may periodically transmit advertisement messages that may be used for calculating cost and/or quality of communications in the network 200c. For example, router device 225c may send an advertisement message that is received by leader device 215 and leader device 215 may send an advertisement message that is received by router device 225c. Each router device may measure the received communication quality metric (e.g., RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a broadcast or multicast message. The advertisement messages transmitted by a router device may be received by neighboring router devices that share a single-hop network communication link with the router device transmitting the advertisement messages. A single-hop network communication link may be capable of communicating messages from a router device via a unicast and/or multicast communication directly to another router device. For example, the router devices 225a, 225c may be neighboring devices that share a single-hop communication link with the leader device 215, as the router devices 225a, 225c are capable of sending messages directly to and/or receiving messages directly from the leader device 215. The single-hop network communication link may be a network communication link on which router devices may be capable of directly receiving the advertisement messages above a given link quality (e.g., LQI greater than 0).

After a router device receives a periodic advertisement message from another router device, the router device may calculate the link quality (e.g., LQI) of the network communication link via which the advertisement message is received. The LQI may be calculated as a predefined number that is within a range indicating different link qualities for the network communication link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a network communication link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a network communication link with a neighboring router device when the RSSI value of one or more advertisement messages (e.g., average RSSI for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for network communication links between neighboring routing devices.

The LQI of the network communication links measured locally at each control device (e.g., the leader device 215 and the router device 225c) may be exchanged with the other device on the network communication link. For example, the LQI may be measured locally at each control device and transmitted to the other device via an advertisement message. The LQI that is measured by another router device (e.g., on the other side of the network communication link) and received at a router device may be stored as the link quality out (LQO) for the network communication link. The LQI and/or the LQO may be stored in a local router table at each router device. For example, the leader device 215 may store the LQI and/or the LQO for the network communication link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the network communication link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a network communication link with other router devices. The link quality for the network communication link between the two router devices may be the lesser of the value of the link quality for messages being transmitted out (e.g., LQO) and the value of the link quality for messages being received (e.g., LQI) on a single-hop network communication link between two devices. An LQO or an LQI of zero may indicate that the router device fails to have a direct network communication link with the router device listed in the router table.

Figure 2D:
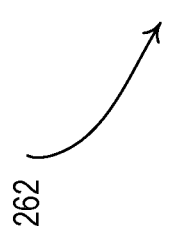
FIG. 2D is an example table that illustrates example link costs that may correspond to different link qualities.

A link cost for sending communications between devices on a network communication link may correspond directly to the link quality of communications on the network communication link. The link cost may indicate a relative cost or loss of communications on the network communication link. FIG. 2D is an example table 262 that illustrates example link costs that may correspond to different link qualities. As shown in FIG. 2D, a greater link quality may correspond to a lower link cost for communications on the network communication link between two neighboring devices.

The link cost for each network communication link may be used by a router device to calculate a path cost for communications between the router device and another router device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages.

The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop network communication link as being equal to the link cost and store the path cost in the locally-stored router table. For example, the router device 225c may set the path cost for communications with the leader device 215 equal to the link cost (e.g., lower of LQI and LQO) on the network communication link and store the path cost in the router table 261. Similarly, the router device 225c may set the path cost for communications with the router device 225b equal to the link cost (e.g., lower of LQI and LQO) on network communication link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225b may be unable to directly communicate with the leader device 215, the router device 225*b* may receive path cost information for communicating messages through another router in the network 200*c*. The router 225*c* may transmit the path cost for communicating messages to/from the leader device 215 (e.g., path cost=2) in a multicast message that is received by other router devices. The multicast message may be an advertisement message, for example. The router device 225*b* may receive the path cost for communicating messages between the leader device 215 and the router device 225*c* (e.g., path cost=2). To calculate the total path cost for communicating messages between the router device 225*b* and the leader device 215 through the router device 225*c*, the router device 225*b* may add the link cost for communications between the router device 225*b* and the router device 225*c* (e.g., link cost=1) to the path cost received from the router device 225*c* (e.g., path cost=1) to get a total path cost (e.g., path cost=3). The link cost for communications between the router device 225*b* and the router device 225*c* may be determined from the link quality of the network communication link between the router device 225*b* and the router device 225*c*, which may be the smaller of the LQI and LQO of the network communication link (e.g., link quality=3).

Each router device may send/broadcast an advertisement message that includes the path cost to one or more other router devices in the network 200*c*. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225*b* to the leader device 215 may be communicated through the router device 225*a* or the router device 225*c*. The router device 225*b* may receive respective advertisement messages from the router device 225*a* and the router device 225*c* that indicate the path cost for communication of messages between the router device 225*a* and the leader device 215 is the same as the path cost for communication of messages between the router device 225*c* and the leader device 215 (e.g., path cost=2 on each network communication link). The router device 225*b* may add the link cost calculated for communicating messages between the router device 225*b* and the router device 225*c* (e.g., link cost=1) to the path cost information received in the advertisement message from the router 225*c* (e.g., path cost=2) to determine the total path cost for communicating with the leader device 215 through the router device 225*c* (e.g., total path cost=3). The router device 225*b* may similarly add the link cost calculated for communicating messages between the router 225*b* and the router 225*a* (e.g., link cost=2) to the path cost information received in the advertisement message from the router 225*a* (e.g., path cost=2) to determine the total path cost for communicating with the leader device 215 through the router device 225*a* (e.g., total path cost=4). The router device 225*b* may update a locally-stored router table with the lowest calculated path cost for communicating with the leader device 215 and/or the identifier of the router device through which messages are to be transmitted (e.g., router 225*c*). Each router device may similarly update their respective locally-stored router table with the lowest calculated path cost for communicating with the other router devices in the network 200*c*. For example, as shown in FIG. 2E, the leader device 215 and the router device 225*c* may each calculate the lowest path cost for communicating to other router devices in the network 200*c* and store the path cost in the respective router tables 229, 261. The router tables 229, 261 may also have stored therein the router identifier of the next hop from the respective devices 215, 225*c* through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200*c*. The router device may use the best communication path (e.g., lowest cost path) for communicating messages to another device. This routing mechanism may allow router devices to detect when other router devices have dropped off the network 200*c*, or a path cost between router devices has changed, and calculate the next lowest cost path to maintain connectivity to other router devices in the network 200*c*.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225*a*, 225*b*, 225*c*, 225*d*, 225*e*, 225*f* in network 200*c*). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225*a*, 225*b*, 225*c*, 225*d*, 225*e*, 225*f* in network 200*c*) to identify updated network information transmitted in advertisement messages. For example, as router devices (e.g., leader device 215 and/or router devices 225*a*, 225*b*, 225*c*, 225*d*, 225*e*, 225*f* in network 200*c*) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225*c* may receive the sequence number directly from the leader device 215 and use the sequence number in subsequent advertisement messages. The router device 225*b* may receive the sequence number in the advertisement messages transmitted from the router device 225*c* and use the sequence number in subsequent advertisement messages transmitted from the router device 225*b*. The router devices may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

As described herein, the load control system (e.g., load control system 100) may be configured to enable transmission of messages between control devices via a wireless communication network (e.g., network 200, 200a). The control devices communicating on the wireless communication network may perform communications on overlapping communication channels (e.g., frequency channels) within the same space. For example, a building may have multiple floors, and each floor may have a system controller configured to communicate with various control devices. The communications may be sent on overlapping frequency channels. In addition to the devices in the load control system, there may be other devices (e.g., other mobile devices, computers, appliances, and/or other devices in the space) using the same frequency channels. There may be a relatively large amount of RF traffic on the frequency channels, increasing the amount of radio frequency interference (RFI) on the frequency channels. The radio frequency interference may cause the devices in the load control system to drop packets transmitted on the network, thereby decreasing reliability and increasing latency on the network.

The control devices in the load control system may perform a modified carrier sense multiple access (CSMA) technique to increase reliability of communications on the network. The CSMA technique may reduce the chance of collisions between messages communicated on a network. For example, the control devices in the load control system that use the CSMA technique may employ a listen before talk (LBT) tactic when transmitting messages. Using the LBT tactic, a control device may measure a signal strength magnitude (e.g., a present signal strength magnitude) of RF traffic (e.g., RF energy) on a given frequency channel before sending a message. For example, the control device may measure the present signal strength magnitude of the frequency channel by determining a received signal strength indicator (RSSI) value of the RF traffic on the frequency channel. A high value for the signal strength magnitude may indicate that the frequency channel is relatively open thus allowing for increased reliability for messages transmitted on the network (e.g., the frequency channel is quiet and/or is not being used by other devices). A low value for the signal strength magnitude may indicate that the frequency channel is relatively congested and may cause decreased reliability for messages transmitted on the network (e.g., the frequency channel is noisy and/or is being used by other devices).

The control device may measure the signal strength value of the RF traffic on the frequency channel and may compare the measured signal strength value to a transmission threshold (e.g., a CSMA threshold). If the measured signal strength magnitude is less than the transmission threshold, the control device may transmit the message. If the measured signal strength magnitude is greater than, or equal to, the threshold value, the control device may delay the transmission of the message. For example, the control device may wait for a predetermined period of time after performing the measurement of the signal strength magnitude and/or comparing the measurement to the threshold. After the predetermined period of time expires, the control device may perform another measurement of the signal strength magnitude and/or attempt to transmit the message again.

When control devices perform the CSMA technique, the reliability of transmissions of messages between the control devices in the load control system may increase. However, the increase in reliability may come at the expense of latency. For example, if the number of devices in the load control system is sufficiently large, control devices may occupy the frequency channel for extended periods of time even if the control devices in the load control system are performing the CSMA technique. For example, a given control device in the load control system may perform measurements of the signal strength magnitude multiple times before transmitting a message, thus increasing latency.

The control devices in the load control system may employ an adaptive transmission threshold $TH_{TX}$ (e.g., an adaptive CSMA threshold) when using the CSMA technique to have a lower latency, while still maintaining increased reliability. Prior to transmitting a message, a control device may analyze the communication channel (e.g., frequency channel) using the adaptive transmission threshold $TH_{TX}$ to determine if the message should be transmitted. The control device may measure a metric of the frequency channel, such as the signal strength magnitude (e.g., a received signal strength indicator) of the RF traffic on a frequency channel and compare the measurement to the adaptive transmission threshold $TH_{TX}$. The control device may transmit the message when the measured signal strength magnitude is below the adaptive transmission threshold $TH_{TX}$. The control device may increase or decrease the adaptive transmission threshold $TH_{TX}$ to increase reliability of communications on the network, while allowing for a balanced latency for the tradeoff of increased reliability. When the control device tries to transmit a given message for the first time, the control device may set the adaptive transmission threshold $TH_{TX}$ to a relatively low level. If the measured signal strength magnitude is above the adaptive transmission threshold $TH_{TX}$, the control device may increase the adaptive transmission threshold $TH_{TX}$ to increase the likelihood that the next measurement of the of the signal strength magnitude will be below the adaptive transmission threshold $TH_{TX}$ and the control device will transmit the message. The control device may continue to increase the adaptive transmission threshold $TH_{TX}$ until the message is transmitted. By first analyzing the frequency channel the adaptive transmission threshold $TH_{TX}$ at the low level and then gradually increasing the transmission threshold $TH_{TX}$, the control device first has the chance to transmit the message when the frequency channel is quietest while gradually increasing the likelihood of transmitting the message at the same time as another control device.

Figure 3:
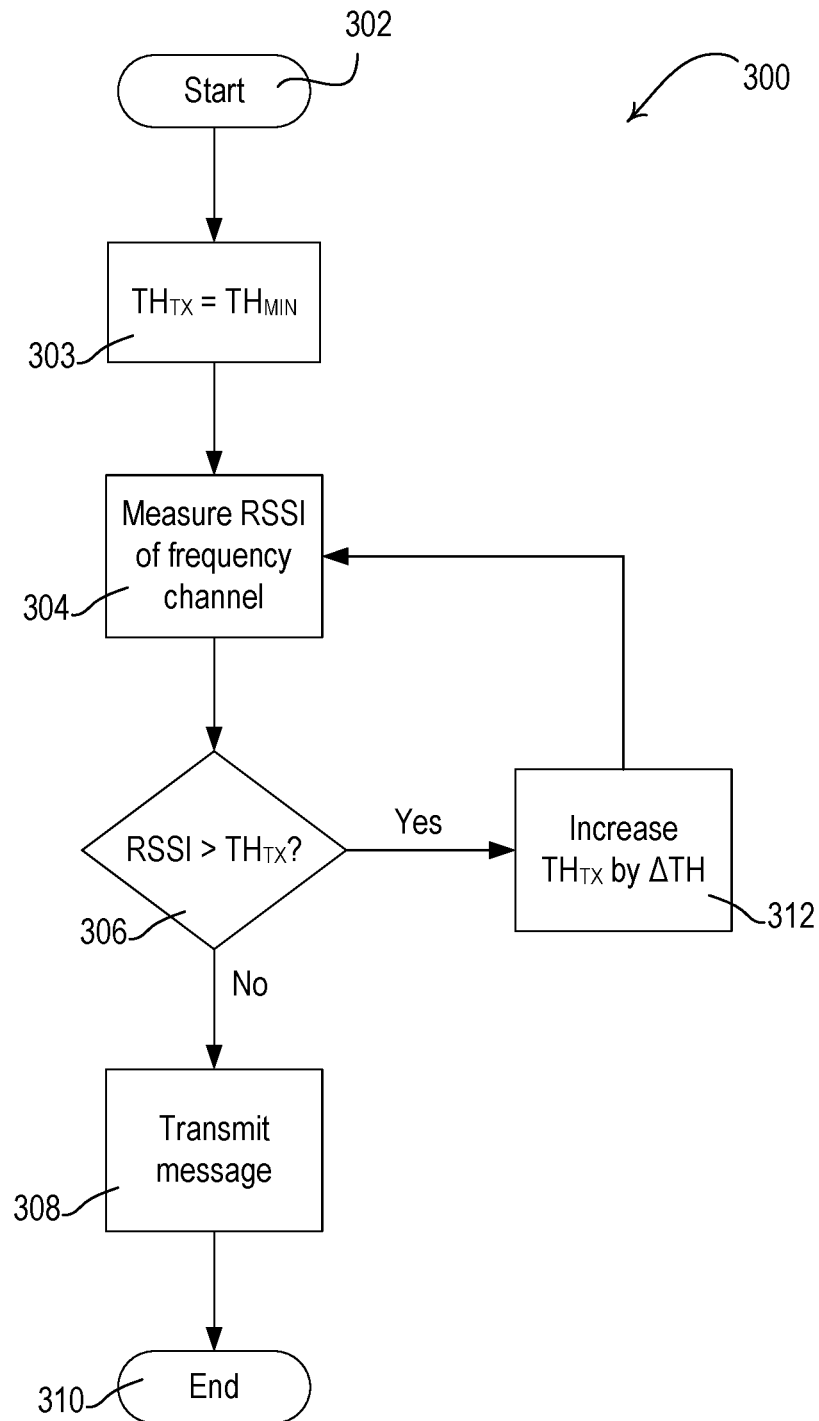
FIG. 3 is a flowchart depicting an example procedure for performing a carrier sense multiple access (CSMA) technique with an adaptive transmission threshold.

FIG. 3 is a flowchart depicting an example procedure 300 for performing a CSMA technique using an adaptive transmission threshold $TH_{TX}$. The procedure 300 may be performed by a control circuit of a control device in a load control system. For example, the control device may be one of the control devices in the load control system 100 (e.g., the load control devices, the input devices, the mobile device 190, and/or the system controller 110) and/or one of the control devices capable of performing communications in a network similar to the networks 200, 200a. There may be a relatively large amount of radio frequency (RF) traffic in the network due to the messages being transmitted between the control devices in the load control system. As the amount of RF traffic in the network increases, the incidence of collisions between transmissions may increase, which may result in communication errors (e.g., collisions of messages). The control device in the load control system may perform the procedure 300 based on a triggering event. For example, the control device may perform the procedure 300, or portions thereof, after queueing of a message to be transmitted, or after receipt of a message for which a response message is to be transmitted.

The procedure 300 may be used to attempt to reduce the amount of RF traffic in the network while balancing latency for the transmission of messages. For example, a control device performing the procedure 300 may perform the CSMA technique when transmitting a message. Performing the procedure 300 may result in the control device having an increased likelihood of transmitting a message after each instance of an LBT failure, which may occur when the measured signal strength magnitude fails to be equal to or lower than the transmission threshold $TH_{TX}$. The control device may become progressively more likely to transmit the message after each instance of LBT failure.

The procedure 300 may begin at 302. At 303, the control circuit of the control device may initialize the transmission threshold $TH_{TX}$ to a minimum threshold value $TH_{MIN}$. The minimum threshold value $TH_{MIN}$ may be preconfigured in the control device and/or indicated in a message received by the control device. For example, the minimum threshold value $TH_{MIN}$ may be received by the control device from the system controller or another remote computing device. The minimum threshold value $TH_{MIN}$ may be approximately −90 dBm, and the control device may set the transmission threshold $TH_{TX}$ to have a value of −90 dBm.

At 304, the control circuit of the control device may measure a metric of the frequency channel (e.g., a present signal strength magnitude of the RF traffic on the frequency channel. For example, the control device may measure the signal strength magnitude at 304 by measuring the RSSI value of RF traffic on the frequency channel. For example, the frequency channel may be a frequency channel used by the control devices to send messages to and/or receive messages from one or more other control devices in the network.

At 306, the control circuit of the control device may compare the measured RSSI value to the transmission threshold $TH_{TX}$. The control device may determine whether the measured RSSI value is greater than, equal to, or less than the transmission threshold $TH_{TX}$. If the measured RSSI value is less than (e.g., less than or equal to) the transmission threshold $TH_{TX}$, the control circuit of the control device may transmit the message at 308 via the communication circuit and the procedure 300 may end at 310. If the measured RSSI value is greater than the transmission threshold $TH_{TX}$, the control circuit of the control device may increase the transmission threshold $TH_{TX}$ by an increment ΔTH at 312. For example, the increment ΔTH may be between approximately 5-10 dBm. The increment ΔTH may be preconfigured in the control device (e.g., stored therein) and/or indicated in a message received by the control device. For example, the increment ΔTH may be received by the control device from the system controller or another remote computing device. The increment ΔTH may be a fixed amount, a predefined amount, or a variable amount. The value of the increment ΔTH may be determined as a function of one or more predefined parameters. For example, the one or more parameters may include a number of previous attempts of transmitting the message, the communication quality metric of the frequency channel, a difference between the communication quality metric of the frequency channel and the transmission threshold $TH_{TX}$, an amount of near-channel interference (e.g., a noise level on a communication channel adjacent to the frequency channel), a link quality associated with the frequency channel, a path loss associated with the frequency channel, and/or the like. Incrementing the transmission threshold $TH_{TX}$ may increase the likelihood that the control device may transmit the message without additional delay. After increasing the transmission threshold $TH_{TX}$, the control circuit of the control device may measure the RSSI value of the frequency channel at 304 for comparison with the incremented transmission threshold $TH_{TX}$ at 306. The control device may continue to increment the transmission threshold $TH_{TX}$ until the measured RSSI value is less than or equal to the transmission threshold $TH_{TX}$ and/or the message is transmitted. For example, the control device may measure the metric of the frequency channel, compare the metric to the transmission threshold $TH_{TX}$, and/or increase the transmission threshold $TH_{TX}$ after each expiration of a predefined interval before transmitting the message. The control device may reset the transmission threshold $TH_{TX}$ after transmission of the message.

Figure 4:
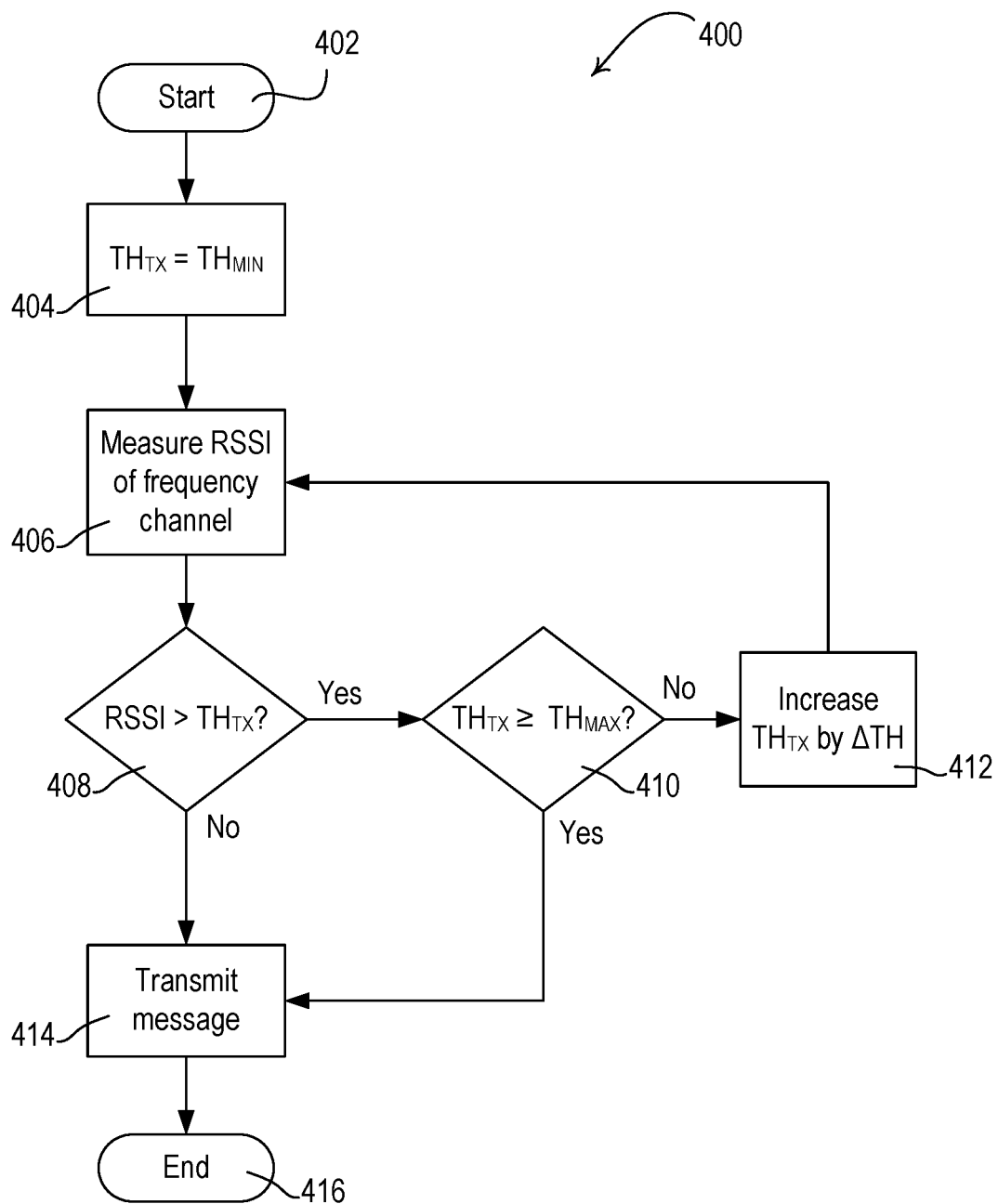
FIG. 4 is a flowchart depicting an example procedure for performing a CSMA technique with an adaptive transmission threshold and a maximum threshold value.

As the adaptive transmission threshold $TH_{TX}$ may continue to be increased, a maximum threshold value $TH_{MAX}$ may be set to limit the delay or latency of a transmission of a message. FIG. 4 is a flowchart depicting an example procedure 400 for performing a CSMA technique using an adaptive transmission threshold $TH_{TX}$ and a maximum threshold value $TH_{MAX}$. The procedure 400 may be performed by a control device in a load control system. For example, the control device may be one of the control devices in the load control system 100 (e.g., the load control devices, the input devices, the mobile device 190, and/or the system controller 110) and/or one of the control devices capable of performing communications in a network similar to the networks 200, 200a. There may be a relatively large amount of radio frequency (RF) traffic in the network due to the messages being transmitted between the control devices in the load control system. As the amount of RF traffic in the network increases, the incidence of collisions between transmissions may increase, which may result in communication errors (e.g., collisions of messages). The control device in the load control system may perform the procedure 400 based on a triggering event. For example, the control device may perform the procedure 400, or portions thereof, after queueing of a message to be transmitted, or after receipt of a message for which a response message is to be transmitted.

The procedure 400 may be used to attempt to reduce the amount of RF traffic in the network while balancing latency for the transmission of messages. For example, a control device performing the procedure 400 may perform the CSMA technique when transmitting a message. Performing the procedure 400 may result in the control device having an increased likelihood of transmitting a message after each instance of an LBT failure. The control device may become progressively more likely to transmit the message after each instance of LBT failure.

The procedure 400 may begin at 402. At 404, the control circuit of the control device in the load control system may initialize the transmission threshold $TH_{TX}$ to a minimum threshold value $TH_{MIN}$. The minimum threshold value $TH_{MIN}$ may be preconfigured in the control device and/or indicated in a message received by the control device. For example, the minimum threshold value $TH_{MIN}$ may be received by the control device from the system controller or another remote computing device. The minimum threshold value $TH_{MIN}$ may be approximately −90 dBm, and the control device may set the transmission threshold $TH_{TX}$ to have a value of −90 dBm.

At 406, the control circuit of the control device may measure a metric of the frequency channel (e.g., a present signal strength magnitude of the RF traffic on the frequency channel). For example, the control device may measure the signal strength magnitude at 406 by measuring the RSSI value of RF traffic on the frequency channel. The frequency channel may be a frequency channel used by the control device to send messages to and/or receive messages from one or more other control devices in the network.

At 408, the control circuit of the control device may compare the measured RSSI value to the transmission threshold $TH_{TX}$. The control device may determine whether the measured RSSI value is greater than, equal to, or less than the transmission threshold $TH_{TX}$. If the measured RSSI value is less than (e.g., less than or equal to) the transmission threshold $TH_{TX}$, the control device may transmit the message at 414 and the procedure 400 may end at 416. If the measured RSSI value is greater than the transmission threshold $TH_{TX}$, the control circuit of the control device may compare the transmission threshold $TH_{TX}$ to the maximum threshold value $TH_{MAX}$ at 410. For example, the maximum threshold value $TH_{MAX}$ may be approximately −45 dBm. If the transmission threshold $TH_{TX}$ is greater than or equal to the maximum threshold value $TH_{MAX}$ at 410, the control circuit of the control device may transmit the message at 414 via the communication circuit and the procedure 400 may end at 416. The maximum threshold value $TH_{MAX}$ may be set to limit the delay or latency of a transmission of a message.

If the transmission threshold $TH_{TX}$ is not greater than or equal to the maximum threshold value $TH_{MAX}$ at 410, the control circuit of the control device may increase the transmission threshold $TH_{TX}$ by an increment $\Delta TH$ at 412. For example, the increment $\Delta TH$ may be between approximately 5-10 dBm. The increment $\Delta TH$ may be preconfigured in the control device (e.g., stored therein) and/or indicated in a message received by the control device. For example, the increment $\Delta TH$ may be received by the control device from the system controller or another remote computing device. The increment $\Delta TH$ may be a fixed amount, a predefined amount, or a variable amount. The value of the increment $\Delta TH$ may be determined as a function of one or more predefined parameters. For example, the one or more parameters may include a number of previous attempts of transmitting the message, the communication quality metric of the frequency channel, a difference between the communication quality metric of the frequency channel and the transmission threshold $TH_{TX}$, an amount of near-channel interference (e.g., a noise level on a communication channel adjacent to the frequency channel), a link quality associated with the frequency channel, a path loss associated with the frequency channel, and/or the like. Incrementing the transmission threshold $TH_{TX}$ may increase the likelihood that the control device may transmit the message. After increasing the transmission threshold $TH_{TX}$, the control device may measure the RSSI value of the frequency channel at 406 for comparison with the incremented transmission threshold $TH_{TX}$ at 408. The control device may continue to increment the transmission threshold $TH_{TX}$ until the measured RSSI value is less than or equal to the transmission threshold $TH_{TX}$ and/or the message is transmitted. For example, the control device may measure the metric of the frequency channel, compare the metric to the transmission threshold $TH_{TX}$, and/or increase the transmission threshold $TH_{TX}$ after each expiration of a predefined interval before transmitting the message or the transmission threshold $TH_{TX}$ has been reached. The control device may reset the transmission threshold after transmission of the message.

Figure 5:
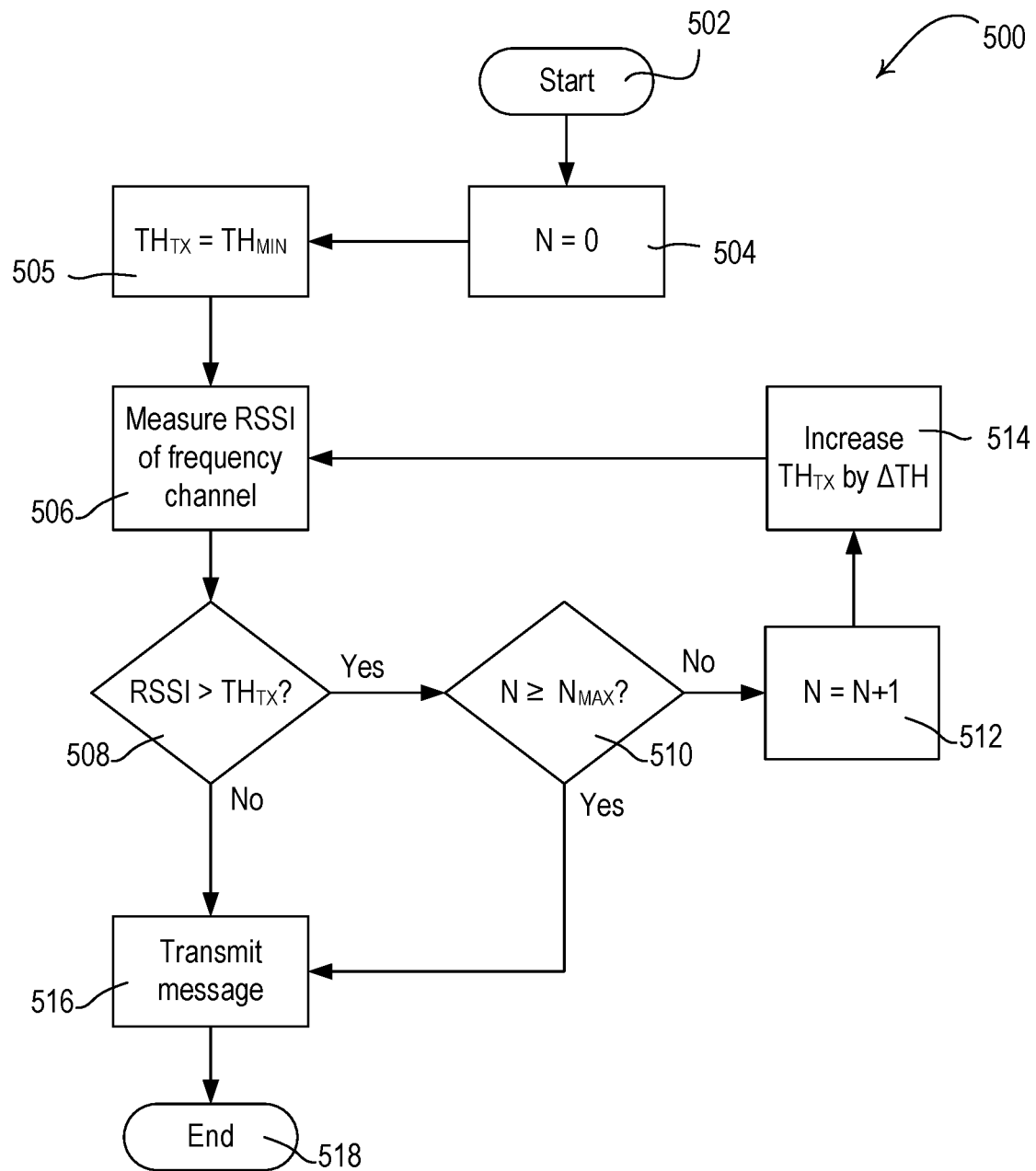
FIG. 5 is a flowchart depicting an example procedure for performing a CSMA technique with an adaptive transmission threshold and a counter.

The adaptive transmission threshold $TH_{TX}$ may be adjusted a number of times to prevent the number of transmission attempts from exceeding a maximum number as the control device attempts to increase the likelihood of transmission of the message on the frequency channel. FIG. 5 is a flowchart depicting an example procedure 500 for performing a CSMA technique using an adaptive transmission threshold $TH_{TX}$ and a counter. The procedure 500 may be performed by a control device in a load control system. For example, the control device may be one of the control devices in the load control system 100 (e.g., the load control devices, the input devices, the mobile device 190, and/or the system controller 110) and/or one of the control devices capable of performing communications in the networks 200, 200a. There may be a relatively large amount of radio frequency (RF) traffic in the network due to the messages being transmitted between the control devices in the load control system. As the amount of RF traffic in the network increases, the incidence of collisions between transmissions may increase, which may result in communication errors (e.g., collisions of messages). The control device in the load control system may perform the procedure 500 based on a triggering event. For example, the control device may perform the procedure 500, or portions thereof, after queueing of a message to be transmitted, or after receipt of a message for which a response message is to be transmitted.

The procedure 500 may be used to reduce the amount of RF traffic in the network while balancing latency for the transmission of messages. For example, a control device in the load control system performing the procedure 500 may perform the CSMA technique when transmitting a message. Performing the procedure 500 may result in the control device having an increased likelihood of transmitting a message after each instance of an LBT failure. The control device may become progressively more likely to transmit the message after each instance of LBT failure. Implementing a counter may ensure that the message is transmitted after a certain number of LBT failures, regardless of RF traffic or interference.

The procedure 500 may begin at 502. At 504, the control circuit of the control device in the load control system may initialize a counter N to a minimum value (e.g., zero). The minimum value may be preconfigured in the control device and/or indicated in a message received by the control device. For example, the minimum value at which the counter N is initialized may be received by the control device in the load control system from the system controller or another remote computing device.

At 505, the control circuit of the control device in the load control system may initialize the transmission threshold $TH_{TX}$ to a minimum threshold value $TH_{MIN}$. The minimum threshold value $TH_{MIN}$ may be preconfigured in the control device and/or indicated in a message received by the control device. For example, the minimum threshold value $TH_{MIN}$ may be received by the control device from the system controller or another remote computing device. The minimum threshold value $TH_{MIN}$ may be approximately −90 dBm, and the control device may set the transmission threshold $TH_{TX}$ to have a value of −90 dBm.

At 506, the control circuit of the control device may measure a metric of the frequency channel (e.g., a present signal strength magnitude of the RF traffic on the frequency channel). For example, the control device may measure the signal strength magnitude at 506 by measuring the RSSI value of RF traffic on the frequency channel. For example, the frequency channel may be a frequency channel used by the control devices to send messages to and/or receive message from one or more other control devices in the network.

At 508, the control circuit of the control device may compare the measured RSSI value to the transmission threshold $TH_{TX}$. The transmission threshold $TH_{TX}$ may be preconfigured in the device and/or indicated in a message received by the control device. For example, the transmission threshold $TH_{TX}$ may be received by the control device in the load control system from the system controller or another remote computing device. The control device may determine whether the measured RSSI value is greater than, equal to, or less than the transmission threshold $TH_{TX}$. If the measured RSSI value is less than (e.g., less than or equal to) the transmission threshold $TH_{TX}$, the control circuit of the control device may transmit the message at 516 via the communication circuit and the procedure 500 may end at 518. If the measured RSSI value is greater than the transmission threshold $TH_{TX}$, the control circuit of the control device may compare the counter N to a maximum counter value $N_{MAX}$ at 510. For example, the maximum counter value $N_{MAX}$ may be set to 10. If the counter N is greater than or equal to the maximum counter value $N_{MAX}$ at 510, the control circuit of the control device may transmit the message at 516 via the communication circuit and the procedure 500 may end at 518. The maximum counter value $N_{MAX}$ may prevent the number of transmission attempts from exceeding a defined value. The maximum counter value $N_{MAX}$ may be preconfigured in the device and/or indicated in a message received by the device. For example, the maximum counter value $N_{MAX}$ may be received by the control device in the load control system from the system controller or another remote computing device.

If the counter N is less than or equal to the maximum counter value $N_{MAX}$, the control circuit of the control device may increment the counter N by a predefined value (e.g., one) at 512. Delaying the transmission of the message while the counter N is being incremented may increase the likelihood that the control device may successfully transmit the message. The control circuit of the control device may increase the transmission threshold $TH_{TX}$ by an increment $\Delta TH$ at 514. For example, the increment $\Delta TH$ may be between approximately 5-10 dBm. The increment $\Delta TH$ may be preconfigured in the control device (e.g., stored therein) and/or indicated in a message received by the control device. For example, the increment $\Delta TH$ may be received by the control device from the system controller or another remote computing device. The increment $\Delta TH$ may be a fixed amount, a predefined amount, or a variable amount. The value of the increment $\Delta TH$ may be determined as a function of one or more predefined parameters. For example, the one or more parameters may include a number of previous attempts of transmitting the message, the communication quality metric of the frequency channel, a difference between the communication quality metric of the frequency channel and the transmission threshold $TH_{TX}$, an amount of near-channel interference (e.g., a noise level on a communication channel adjacent to the frequency channel), a link quality associated with the frequency channel, a path loss associated with the frequency channel, and/or the like. Incrementing the transmission threshold $TH_{TX}$ may increase the likelihood that the control device may transmit the message. After increasing the transmission threshold $TH_{TX}$, the control circuit of the control device may measure the RSSI value of the frequency channel at 506 for comparison with the transmission threshold $TH_{TX}$ at 508. The control circuit of the control device may continue to increment the counter N at 512 and increment the transmission threshold $TH_{TX}$ at 514 until the counter N is equal to or greater than the maximum counter value $N_{MAX}$ at 510 or the measured RSSI value of the frequency channel is less than or equal to the transmission threshold $TH_{TX}$ at 508. Thus, the control device may attempt to transmit the message when the RSSI value of the frequency channel is less than or equal to the transmission threshold $TH_{TX}$, or a defined number of attempts have been made for transmitting the message. For example, the control device may measure the metric of the frequency channel, compare the metric to the transmission threshold $TH_{TX}$, and/or increase the transmission threshold $TH_{TX}$ after each expiration of a predefined interval before transmitting the message, the transmission threshold $TH_{TX}$ is reached, or a defined number of attempts have been made for transmitting the message. The control device may reset the transmission threshold $TH_{TX}$ and/or the counter N after transmission of the message.

Figure 6:
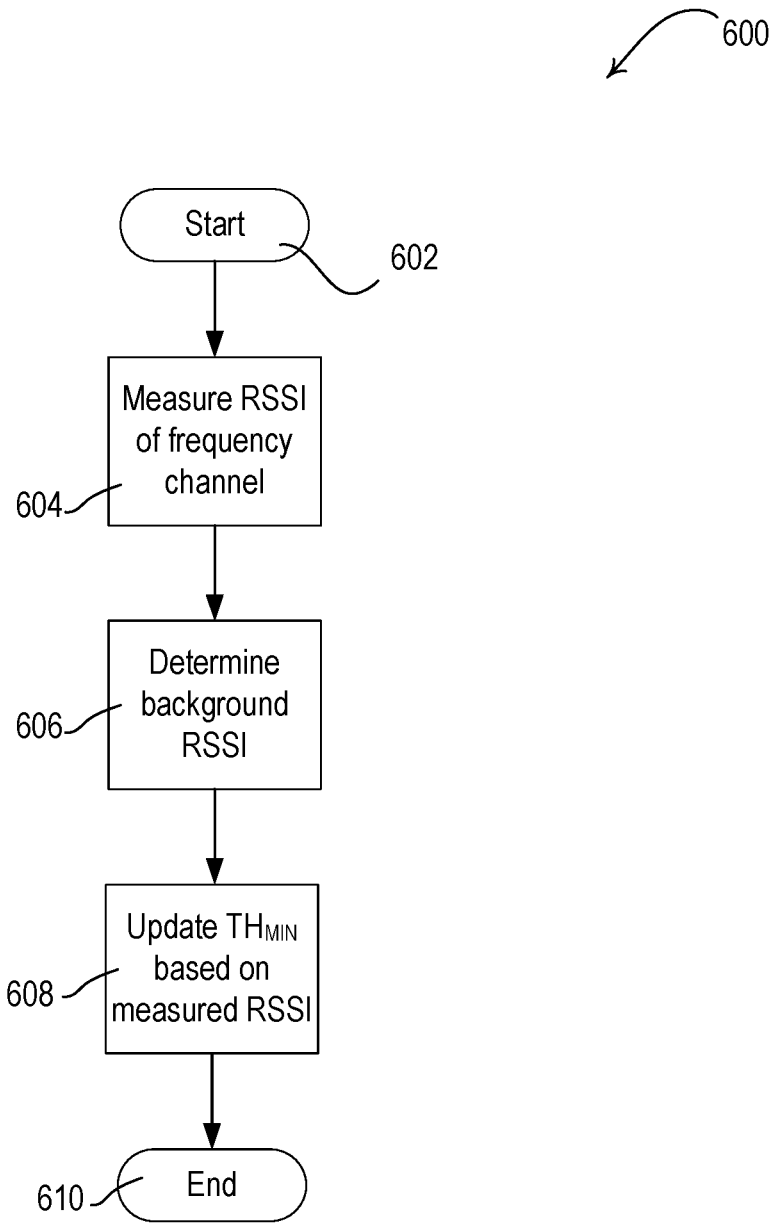
FIG. 6 is a flowchart depicting an example procedure for determining a background signal strength magnitude of a frequency channel for updating an adaptive transmission threshold used when performing a CSMA technique.

As the background noise in different locations in the space in which the network is deployed may vary, the adaptive transmission threshold $TH_{TX}$ may be based on a background signal strength magnitude (e.g., a background RSSI value) if the frequency channel measured at a certain time and/or in a certain location at which the control device is installed in the space. Basing the adaptive transmission threshold $TH_{TX}$ on the background signal strength magnitude may ensure that control devices located in spaces with differing amounts of RF traffic maintain similar likelihoods of communicating messages. FIG. 6 is a flowchart depicting an example procedure 600 for determining the background signal strength magnitude (e.g., the background RSSI value) of a frequency channel. The procedure 600 may be performed by a control device in a load control system. For example, the control device may be one of the devices in the load control system 100 (e.g., the load control devices, the input devices, the mobile device 190, and/or the system controller 110) and/or one of the control devices capable of performing communications in a network similar to the networks 200, 200a. There may be a relatively large amount of radio frequency (RF) traffic in the network due to the messages being transmitted between the control devices in the load control system. As the amount of RF traffic in the network increases, the incidence of collisions between transmissions may increase, which may result in communication errors (e.g., collisions of messages). The control device in the load control system may perform the procedure 600 based on a triggering event. For example, the control device may perform the procedure 600, or portions thereof, periodically.

The procedure 600 may be used to ensure that control devices located in spaces with differing amounts of RF traffic maintain similar likelihoods of transmitting messages. For example, a control device performing the procedure 600 may dynamically adjust a value for the transmission threshold $TH_{TX}$ based on the background signal strength magnitude in the space. The control device may adjust the transmission threshold $TH_{TX}$ based on, for example, a measured background RSSI value. Dynamically adjusting the value for the transmission threshold $TH_{TX}$ may increase the likelihood that a message will be transmitted by controlling for the average amount of RF traffic in the space in which the control device is located. The control device in a space with more RF traffic may have a higher value for the transmission threshold $TH_{TX}$ than a control device in a space with less RF traffic. For example, the control device may be located near a noise source, such as a wireless access point (WAP), a microwave oven, a security badge reader, a motor, and/or other radio-frequency noise-generating device.

The procedure 600 may begin at 602. At 604, the control circuit of the control device in the load control system may measure a metric of the frequency channel (e.g., a present signal strength magnitude of the RF traffic on the frequency channel). For example, the control device may measure the signal strength magnitude at 604 by measuring the RSSI value of RF traffic on the frequency channel. At 606, the control circuit of the control device may update a value of the background signal strength (e.g., the background RSSI value) of the frequency channel. For example, the control device may determine the background RSSI value by continuously or periodically measuring the RSSI value of the frequency channel. The background RSSI value may be calculated and updated at 606 using a peak value, time-weighted average, a mean, a median, and/or another form of measurement of measured background signal strength magnitudes (e.g., measured RSSI values) over a period of time. The background RSSI value may be updated continuously or periodically (e.g., as the RSSI value of the frequency channel is measured).

At 608, the control circuit of the control device may update the value of the transmission threshold $TH_{TX}$ (e.g., the minimum threshold value $TH_{MIN}$ of the transmission threshold $TH_{TX}$) based on the background RSSI value. For example, the control device may set the minimum threshold value $TH_{MIN}$ of the transmission threshold $TH_{TX}$ to be equal to the background RSSI value plus an offset value. The offset value may be, for example, 10 dBm. For example, if the background RSSI value is determined to be −90 dBm, the control device may set the minimum threshold value $TH_{MIN}$ of the transmission threshold $TH_{TX}$ to be −80 dBm. At 610, the procedure 600 may exit. After executing the procedure 600 to update the minimum threshold value $TH_{MIN}$ of the transmission threshold $TH_{TX}$, the control device may start with the transmission threshold $TH_{TX}$ set to the minimum threshold value $TH_{MIN}$ that is based on the background signal strength magnitude when subsequently attempting to transmit a message using the procedure 300 shown in FIG. 3, the procedure 400 shown in FIG. 4, and/or the procedure 500 shown in FIG. 5.

Figure 7:
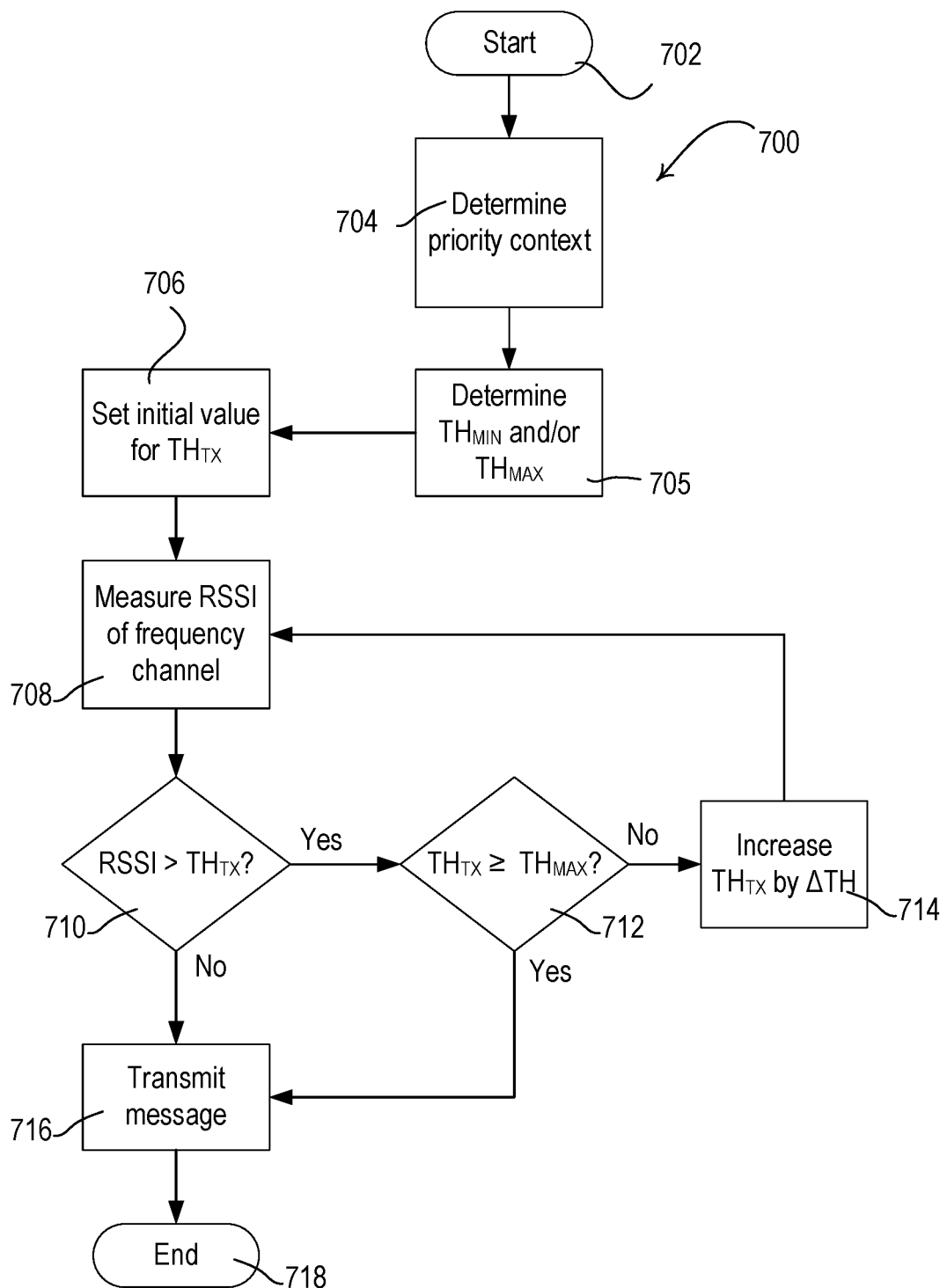
FIG. 7 is a flowchart depicting an example procedure for performing CSMA with a minimum threshold value and a maximum threshold value of an adaptive transmission threshold based on a priority context of a message.

FIG. 7 is a flowchart depicting an example procedure 700 for performing a CSMA technique with an adaptive transmission threshold $TH_{TX}$, where a minimum threshold value $TH_{MIN}$ and/or a maximum threshold value $TH_{MAX}$ of the transmission threshold $TH_{TX}$ may be based on a priority context of a message. The method 700 may be performed by a control circuit of a control device in a load control system. For example, the control device may be one or more of the control devices in the load control system 100 (e.g., the load control devices, the input devices, the mobile device 190, and/or the system controller 110) and/or one of the control devices capable of communicating in a network similar to the networks 200, 200a. There may be a relatively large amount of radio frequency (RF) traffic in the network due to the messages being transmitted between the control devices in the load control system. As the amount of RF traffic in the network increases, the incidence of collisions between transmissions may increase, which may result in communication errors (e.g., collisions of messages). The control device in the load control system may perform the procedure 700 based on a triggering event. For example, the control device may perform the procedure 700, or portions thereof, after queueing of a message to be transmitted, or after receipt of a message for which a response message is to be transmitted.

The procedure 700 may be used to attempt to reduce the amount of RF traffic in the network while balancing latency for the transmission of messages. The control device may use different values for the transmission threshold $TH_{TX}$ (e.g., different values of the minimum threshold value $TH_{MIN}$ and/or the maximum threshold value $TH_{MAX}$ of the CSMA threshold $TH_{TX}$) based on the priority context of the message. For example, the control device may use a higher value for the transmission threshold $TH_{TX}$ (e.g., one or both of the minimum threshold value $TH_{MIN}$ and/or the maximum threshold value $TH_{MAX}$) when the messages have a higher-priority context and a lower value for the transmission threshold $TH_{TX}$ (e.g., one or both of the minimum threshold value $TH_{MIN}$ and/or the maximum threshold value $TH_{MAX}$) when the messages have a lower-priority context. Using a higher value for the transmission threshold $TH_{TX}$ for messages with a higher-priority context may increase the chance that the messages will be transmitted at a given instance (e.g., despite increased RF traffic). Transmission of messages with a lower-priority context may be further delayed to allow for other messages to have a higher success rate.

The procedure 700 may begin at 702. At 704, the control circuit of the control device may determine a priority context of a message to be transmitted. For example, the priority context may be determined to be a higher-priority context for latency critical messages or a lower-priority context for latency non-critical messages. A latency-critical message may be a message for which latency above a predefined latency threshold is unacceptable and/or mitigated with a higher transmission threshold $TH_{TX}$ (e.g., one or both of the minimum threshold value $TH_{MIN}$ and/or the maximum threshold value $TH_{MAX}$). A latency non-critical message may be a message for which latency above the predefined latency threshold is acceptable and/or permitted with the use of a lower transmission threshold $TH_{TX}$ (e.g., one or both of the minimum threshold value $TH_{MIN}$ and/or the maximum threshold value $TH_{MAX}$).

For example, a latency-critical message may be a message where a latency greater than a latency threshold (e.g., 350-375 milliseconds) is unacceptable and/or undesirable. The latency of a message may be measured as a time between a triggering event (e.g., a press of a button, an activation of a sensor device, an activation of a scene, and/or the like) and a corresponding change in a state of the control device. The control device may be, for example, a lighting control device, a thermostat, a speaker, a motorized window shade, and/or the like. The change in the state of the control device may include a change in the intensity or color temperature of light output by the lighting control device, a temperature change, a volume change, and/or a speed or height level of the motorized window treatment. The latency may include one or more hops between devices in the network. A latency greater than the latency threshold may be noticeable to a user of the control device. For example, a delay of greater than 350-375 milliseconds from the time a user triggers a message configured to perform control of an electrical load (e.g., button press, activation of a sensor device, activation of a scene) to the time the electrical load is controlled may be noticeable to the user and, therefore, undesirable in the load control system. A latency non-critical message may be a message in the load control system that may allow for greater latency without causing an undesirable result in the load control system or without causing noticeable delay to the user in the control of the electrical loads in the load control system (e.g., system status messages, heartbeat messages, and/or sensor measurements). For example, a delay of greater than 350-375 milliseconds for a latency non-critical message may not be noticeable to the user.

The control circuit of the control device may determine the priority context based on a device type of the control device from which the message is being transmitted. For example, the control device may be classified as a latency-critical device or a latency non-critical device by having an indication stored thereon in memory. The device type may include, for example, a load control device type (e.g., the lighting control device 120, the plug-in load control device 140, the motorized window treatments 150, the thermostat 160, controllable receptacles, the speaker 146, and/or other types of control-target devices), an input device type (e.g., the remote control device 170, the sensor device 141, and/or other types of input devices), a system controller (e.g., the system controller 110), a mobile device (e.g., the mobile device 190), etc. The device type may indicate a form of communication transmitted from the control device. Each control device type may be associated with a desirable latency. For example, an input device may be associated with a lower desirable latency than a load control device.

The control circuit of the control device may determine the device type based on information stored in a memory of the device. A latency-critical device may be a control device from which input may be received from the user. For example, remote control devices (e.g., keypad devices) and/or dimmer switches may be classified as latency-critical devices. These input devices may be categorized as latency critical devices because latency above the latency threshold may cause noticeable delay in performing load control in response to the user input. Occupancy sensors may be classified as latency-critical devices. Occupancy sensors may be categorized as latency critical devices because latency above the latency threshold may cause noticeable delay in performing load control (e.g., turning lighting loads on) in response to the user entering a load control environment. Other input devices may be classified as latency non-critical devices, having an indicator stored in memory for the control device to determine the priority context at 704. For example, daylight sensors, temperature sensors, humidity sensors, and/or other sensor devices may be classified as latency non-critical devices. These input devices may be categorized as latency non-critical devices because the input devices are sensor devices that are taking incremental measurements that may fluctuate by less than a threshold amount of change over the period of time of the latency threshold, which may fail to cause a noticeable delay in performing load control in response to measurements performed by the sensor devices. In addition, the incremental changes in the values detected by the sensor devices may create incremental changes in the light level output (e.g., lighting intensity) by the control device which may not be noticeable to the user. Further, since the user may not be aware that the sensor devices are taking the measurements, a delay between a measurement and a corresponding change in light level may not be noticeable to the user. Input devices may be classified as latency-critical devices. Load control devices may be classified as latency non-critical devices.

The control circuit of the control device may determine the priority context based on a type and/or content of the message. For example, the message may be classified as a latency-critical message or a latency non-critical message based on the type of message and/or content being transmitted in the message. Messages that include control instructions for controlling an electrical load may be classified as latency-critical messages. Messages configured to cause greater than a threshold amount of change in a level of an electrical load (e.g., lighting level of a lighting load) may be classified as latency-critical messages. Messages configured to cause greater than a threshold amount of change in lighting intensity and/or color (e.g., color temperature) of a lighting load may be classified as latency-critical messages. For example, toggle messages (e.g., on/off toggle) may be classified as latency-critical messages. Messages configured to cause less than the threshold amount of change in the state of the electrical load may be classified as latency non-critical messages. Messages configured to cause less than the threshold amount of change in lighting intensity and/or color (e.g., color temperature) of the lighting load may be classified as latency non-critical messages. Messages comprising status information indicating a state of an electrical load or the load control environment, such as feedback messages, heartbeat messages, or other messages comprising system state information may be classified as latency non-critical messages. The messages configured to cause greater than the threshold amount of change in the level of the electrical load may be classified as latency-critical messages because such a command may cause an amount of change that is noticeable or more noticeable to the user than messages configured to cause less than the threshold amount of change in the level of the electrical load.

Messages comprising sensor information that is configured to cause greater than the threshold amount of change in the level of the electrical load may be latency-critical messages, while messages comprising sensor information that is configured to cause less than the threshold amount of change in the level of the electrical load may be latency non-critical messages. For example, messages indicating an occupancy/vacancy event detected in the space may be classified as a latency-critical message, as occupancy or vacancy condition in the space may trigger a lighting load to be toggled (e.g., turned on and/or off). Messages including sensor information indicating a relative change in lighting intensity or temperature that are transmitted by a daylight sensor or temperature sensor may be classified as latency non-critical messages, as the relative measurement values in the space may be status information indicating a status of the load control environment and/or be configured to cause less than the threshold amount of change in the level of the electrical load.

The control circuit of the control device may determine the priority context based on a transmission type of the message. For example, the transmission type may be unicast, multicast, or broadcast. A unicast message may be classified as a latency-critical message, while a broadcast or multicast message may be classified as a latency non-critical message. The multicast or broadcast message may be classified as a latency critical message to allow multiple control devices to be similarly controlled upon receipt of the multicast message, and the unicast message may be classified as a latency non-critical message as a single control device going unchanged may be unnoticeable to a user. Further, the multicast or broadcast message may be used to transmit latency-critical message types, while the unicast message may be used to transmit latency non-critical message types. In another example, the multicast or broadcast message may be classified as a latency non-critical message, as the multicast or broadcast message may be capable of being received by multiple control devices and forwarded to other control devices in the load control system. The unicast messages may be classified as latency-critical, as it may be configured to be received by a single control device for processing. Repeat messages may be classified as a latency non-critical message, while an initial message in a series of messages being transmitted may be classified as a latency critical message.

The control circuit of the control device may determine the priority context based on a network role associated with the message and/or the control device. For example, messages transmitted by a router device on the network may be classified as latency critical messages, while messages transmitted by end devices may be classified as latency non-critical messages. The priority context of the messages transmitted by the control device may change as the role of the control device changes on the network.

The control circuit of the control device may determine the priority context based on a quality of the network communication link on which messages are being transmitted to/from the control device. Messages to be transmitted on relatively lower-quality network communication links may be classified as latency-critical messages, while messages to be transmitted on relatively higher-quality network communication links may be classified as latency non-critical messages. The strength of a network communication link may be determined based on a link quality, a link cost, a link margin above a noise floor, and/or another communication quality metric. The control circuit may have stored thereon a quality threshold for establishing the relative level of quality for identifying the quality of the network communication links on which messages being transmitted are classified as latency-critical messages or latency non-critical messages. The messages to be transmitted on a relatively lower-quality network communication link may be classified as latency-critical and given a higher-priority context to give the messages a greater chance of success upon initial transmission, while messages to be transmitted on a relatively higher-quality network communication link may be classified as latency non-critical and given a lower-priority context, as these messages may already have a relatively high chance of success upon initial transmission.

The transmission threshold $TH_{TX}$ (e.g., one or both of the minimum threshold value $TH_{MIN}$ and/or the maximum threshold value $TH_{MAX}$) may be adjusted according to the determined priority context. At 705, the control circuit of the control device may determine values for the minimum threshold value $TH_{MIN}$ and/or the maximum threshold value $TH_{MAX}$ of the transmission threshold $TH_{TX}$ based on the determined priority context. For example, if the message is a latency-critical message and/or if the control device type is associated with a relatively lower desirable latency, the control circuit of the control device may select relatively higher values for the minimum threshold value $TH_{MIN}$ and/or the maximum threshold value $TH_{MAX}$. If the message is a latency non-critical message and/or if the device type is associated with a relatively higher desirable latency, the control circuit of the control device may select relatively lower values for the minimum threshold value $TH_{MIN}$ and/or the maximum threshold value $TH_{MAX}$.

The control circuit of the control device may determine the value for the minimum threshold value $TH_{MIN}$ of the transmission threshold $TH_{TX}$ by selecting values from among two or more potential values for the minimum threshold value $TH_{MIN}$ of the transmission threshold $TH_{TX}$. For example, there may be two or more potential minimum threshold values $TH_{MIN}$ of the transmission threshold $TH_{TX}$ that are associated with latency-critical messages and/or control devices. For example, there may be a first latency-critical minimum threshold value $TH_{MIN}$ that is higher than a second latency-critical minimum threshold value $TH_{MIN}$. The first latency-critical minimum threshold value $TH_{MIN}$ and the second latency-critical minimum threshold value $TH_{MIN}$ may each be higher than the minimum threshold value $TH_{MIN}$ for latency-non-critical messages and/or control devices. The first latency-critical minimum threshold value $TH_{MIN}$ and the second latency-critical minimum threshold value $TH_{MIN}$ may each be below a predefined threshold. This may allow the latency-critical minimum threshold value $TH_{MIN}$ to be set to a relatively higher value for latency-critical messages and/or control devices, but be set to a higher or lower threshold depending on network conditions or devices on the network. The potential values for the minimum threshold value $TH_{MIN}$ may be preconfigured in the control device and/or indicated in a message received by the control device. The maximum threshold value $TH_{MAX}$ for each of the messages transmitted by the control devices (e.g., latency-critical and latency non-critical) may be the same. The increased minimum threshold value $TH_{MIN}$ for the latency-critical messages and/or control devices may be set to a higher value to reduce latency in the initial latency-critical messages.

For example, the control device may be an input device (e.g., a control-source device) and/or the message may be a latency-critical message. The control device may select a relatively higher value for the minimum threshold value $TH_{MIN}$ and/or maximum threshold value $TH_{MAX}$. For example, the control device may determine the minimum threshold value $TH_{MIN}$ to be −70 dBm and the maximum threshold value $TH_{MAX}$ to be −25 dBm. In another example, the control device may be a load control device and/or the message may be a latency non-critical message. The control device may select a relatively lower value for the minimum threshold value $TH_{MIN}$ and/or maximum threshold value $TH_{MAX}$. For example, the control device may determine the minimum threshold value $TH_{MIN}$ to be −90 dBm and the maximum threshold value $TH_{MAX}$ to be −45 dBm.

At 706, the control circuit of the control device may set an initial value for the transmission threshold $TH_{TX}$. For example, the control device may set the transmission threshold $TH_{TX}$ to the minimum threshold value $TH_{MIN}$ determined at 705 (e.g., based on the determined priority context). In addition, the minimum threshold value $TH_{MIN}$ may be preconfigured in the control device and/or indicated in a message received by the control device. For example, the minimum threshold value $TH_{MIN}$ may be received by the control device from the system controller or another remote computing device.

At 708, the control circuit of the control device may measure a metric of the network communication link (e.g., a present signal strength magnitude of the RF traffic on the network communication link). For example, the control device may measure the signal strength magnitude at 708 by measuring the RSSI value of RF traffic on one or more frequencies of the network communication link. For example, the network communication link may comprise a communication channel made up of one or more frequencies used by the control device to send messages to and/or receive messages from one or more other control devices in the network. The control device may compare the measured RSSI value to the transmission threshold $TH_{TX}$ at 710. The control device may determine whether the measured RSSI value is greater than, equal to, or less than the transmission threshold $TH_{TX}$. If the measured RSSI value is less than (e.g., less than or equal to) the transmission threshold $TH_{TX}$, the control device may transmit the message at 716 and the procedure 700 may end at 718. If the measured RSSI value is greater than the transmission threshold $TH_{TX}$, the control device may compare the transmission threshold $TH_{TX}$ to the maximum threshold value $TH_{MAX}$. If the transmission threshold $TH_{TX}$ is greater than or equal to the maximum threshold value $TH_{MAX}$, the control device may transmit the message at 716 and the procedure 700 may end at 718.

If the transmission threshold $TH_{TX}$ is not greater than or equal to the maximum threshold value $TH_{MAX}$ at 712, the control device may increase the transmission threshold $TH_{TX}$ by an increment $\Delta TH$ at 714. For example, the increment $\Delta TH$ may be between approximately 5-10 dBm. The increment $\Delta TH$ may be preconfigured in the control device and/or indicated in a message received by the control device. The increment $\Delta TH$ may be a fixed amount, a predefined amount, or a variable amount. The increment $\Delta TH$ may be determined based on the priority context. For example, there may be a latency-critical increment $\Delta TH$ that is higher than a latency non-critical increment $\Delta TH$. The value of the increment $\Delta TH$ may be determined as a function of one or more predefined parameters. For example, the one or more parameters may include a number of previous attempts of transmitting the message, the communication quality metric of the frequency channel, a difference between the communication quality metric of the frequency channel and the transmission threshold $TH_{TX}$, an amount of near-channel interference (e.g., a noise level on a communication channel adjacent to the frequency channel), a link quality associated with the frequency channel, a path loss associated with the frequency channel, and/or the like. Incrementing the transmission threshold $TH_{TX}$ may increase the likelihood that the control device may transmit the message. The control device may measure the RSSI value of the frequency channel at 708 for comparison with the incremented transmission threshold $TH_{TX}$ at 710. The control device may continue to increment the transmission threshold $TH_{TX}$ until the measure RSSI value is less than or equal to the transmission threshold $TH_{TX}$ at 710 or the transmission threshold $TH_{TX}$ is greater than or equal to the maximum threshold value $TH_{MAX}$ at 712, after which the control device may transmit the message at 716 and the procedure 700 may end. The control device may reset the transmission threshold $TH_{TX}$ after transmission of the message.

Although features and elements are described herein in particular combinations, each feature or element can be used alone or in any combination with the other features and elements. The methods described herein may be implemented in a computer program, software, instructions, or firmware stored on one or more non-transitory computer-readable media or other machine-readable media for execution by a computer or machine, or portion thereof. For example, the computer-readable or machine-readable media may be executed by a control circuit, such as a processor. Examples of computer-readable media or machine-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control circuit may access the computer program, software, instructions, or firmware stored on the computer-readable media or machine-readable media for being executed to cause the control circuit to operate as described herein, or to operate one or more devices as described herein.

What is claimed is:

1. A device comprising:
    a communication circuit configured to wirelessly transmit messages on a communication channel; and
    a control circuit configured to:
        measure a first signal strength magnitude of the communication channel;
        on a condition that the first signal strength magnitude is less than a transmission threshold, transmit a message via the communication circuit on the communication channel;
        on a condition that the first signal strength magnitude is not less than the transmission threshold and the transmission threshold is less than a maximum threshold value, increase the transmission threshold by an increment from a first value to a second value to which a second signal strength magnitude of the communication channel will be subsequently compared to determine whether to transmit the message via the communication circuit on the communication channel; and
        on a condition that the transmission threshold is not less than the maximum threshold value, transmit the message on the communication channel via the communication circuit.

2. The device of claim 1, wherein the control circuit is further configured to:
    measure the second signal strength magnitude of the communication channel;
    compare the second signal strength magnitude to the transmission threshold having the second value;
    on a condition that the second signal strength magnitude is less than the transmission threshold, transmit the message on the communication channel via the communication circuit; and
    on a condition that the second signal strength magnitude is not less than the transmission threshold, increase the transmission threshold by the increment from the second value to a third value.

3. The device of claim 1, wherein the first value is configured based on a message received at the control circuit via the communication circuit.

4. The device of claim 1, wherein the control circuit is further configured to:
    determine a background signal strength magnitude for the communication channel; and
    determine the first value based on the background signal strength magnitude.

5. The device of claim 1, wherein the control circuit is further configured to:
    determine a priority context of the message based on at least one of a device type of the device, a content of the message, a transmission type of the message, a network role of the device, and a quality of a network communication link associated with the device; and
    determine the first value of the transmission threshold based on the priority context of the message.

6. The device of claim 5, wherein the control circuit is configured to determine whether the message is a latency-critical message or a latency non-critical message based on the priority context, wherein the first value of the transmission threshold is set to a higher value when the message is determined to be the latency-critical message to achieve a latency below a predefined latency threshold, and wherein the first value of the transmission threshold is set to a lower value when the message is determined to be the latency non-critical message to allow the latency to be above the predefined latency threshold.

7. The device of claim 6, wherein the priority context includes the device type of the device, wherein the device is a remote control device or an occupancy sensor device, and wherein the control circuit is configured to determine that the message is the latency-critical message based on the device being the remote control device or the occupancy sensor device.

8. The device of claim 6, wherein the priority context includes the content of the message, wherein the control circuit is configured to determine that the message is the latency-critical message based on the content of the message including control instructions for controlling an electrical load, and wherein the control circuit is configured to determine that the message is the latency non-critical message based on the content of the message including a state of an electrical load or a load control environment.

9. The device of claim 8, wherein the electrical load is a lighting load, wherein the control circuit is configured to determine that the message is the latency-critical message based on the content of the message including control instructions configured to cause greater than a threshold amount of change in a lighting intensity or color of the lighting load, and wherein the control circuit is configured to determine that the message is the latency non-critical message based on the content of the message including control instructions configured to cause less than the threshold amount of change in the lighting intensity or the color of the lighting load.

10. The device of claim 6, wherein the priority context includes the transmission type of the message, wherein the control circuit is configured to determine that the message is the latency-critical message based on the transmission type being a unicast message, and wherein the control circuit is configured to determine that the message is the latency-non-critical message based on the transmission type being a multicast message or a broadcast message.

11. The device of claim 6, wherein the priority context includes the network role of the device, wherein the control circuit is configured to determine that the message is the latency-critical message based on the network role being a router device, and wherein the control circuit is configured to determine that the message is the latency non-critical message based on the network role being an end device.

12. The device of claim 6, wherein the priority context includes the quality of the network communication link associated with the device, wherein the control circuit is configured to determine that the message is the latency-critical message based on the quality of the network communication link being below a threshold, and wherein the control circuit is configured to determine that the message is the latency non-critical message based on the quality of the network communication link being above the threshold.

13. The device of claim 1, wherein on a condition that the measured signal strength magnitude is not less than the transmission threshold, the control circuit is further configured to:
determine whether the signal strength magnitude of the communication channel has been measured at least a threshold amount of times; and
on a condition that the signal strength magnitude has been measured at least the threshold amount of times, transmit the message via the communication circuit on the communication channel.

14. The device of claim 1, wherein the control circuit is further configured to determine a value of the increment based on one or more of a number of previous attempts of transmitting the message, the first signal strength magnitude, a difference between the first signal strength magnitude and the transmission threshold, an amount of near-channel interference associated with the communication channel, a link quality associated with the communication channel, or a path loss associated with the communication channel.

15. A method comprising:
measuring a first signal strength magnitude of the communication channel;
on a condition that the first signal strength magnitude is less than a transmission threshold, transmitting a message on the communication channel; and
on a condition that the first signal strength magnitude is not less than the transmission threshold and the transmission threshold is less than a maximum threshold value, increasing the transmission threshold by an increment from a first value to a second value to which a second signal strength magnitude of the communication channel will be compared to determine whether to transmit the message on the communication channel; and
on a condition that the transmission threshold is not less than the maximum threshold value, transmitting the message on the communication channel via the communication circuit.

16. The method of claim 15, further comprising:
measuring a second signal strength magnitude of the communication channel;
comparing the second signal strength magnitude to the transmission threshold having the second value;
on a condition that the second signal strength magnitude is less than the transmission threshold, transmitting the message on the communication channel; and
on a condition that the second signal strength magnitude is not less than the transmission threshold, increasing the transmission threshold by the increment from the second value to a third value.

17. The method of claim 15, further comprising:
determining a background signal strength magnitude for the communication channel; and
determining the first value based on the background signal strength magnitude.

18. The method of claim 15, further comprising:
determining a priority context of the message based on one or more of a device type of a device transmitting the message, a content of the message, a transmission type of the message, a network role of the device, and a network communication link associated with the device; and
determining the first value of the transmission threshold based on the priority context of the message.

19. The method of claim 18, further comprising determining whether the message is a latency-critical message or a latency non-critical message based on the priority context, wherein the first value of the transmission threshold is set to a higher value when the message is determined to be the latency-critical message to achieve a latency below a predefined latency threshold, and wherein the first value of the transmission threshold is set to a lower value when the message is determined to be the latency non-critical message to allow the latency to be above the predefined latency threshold.

20. The method of claim 19, wherein the priority context includes the device type of the device, wherein the device is a remote control device or an occupancy sensor device, and wherein the method further comprises determining that the message is the latency-critical message based on the device being the remote control device or the occupancy sensor device.

21. The method of claim 19, wherein the priority context includes the content of the message, wherein the method further comprises at least one of:
- determining that the message is the latency-critical message based on the content of the message including control instructions for controlling an electrical load; and
- determining that the message is the latency non-critical message based on the content of the message including a state of an electrical load or a load control environment.

22. The method of claim 21, wherein the electrical load is a lighting load, and wherein the method further comprises at least one of:
- determining that the message is the latency-critical message based on the content of the message including control instructions configured to cause greater than a threshold amount of change in a lighting intensity or color of the lighting load; and
- determining that the message is the latency non-critical message based on the content of the message including control instructions configured to cause less than the threshold amount of change in the lighting intensity or the color of the lighting load.

23. The method of claim 21, wherein the method further comprises determining that the message is the latency non-critical message based on the content of the message including a state of an electrical load or the load control environment.

24. The method of claim 19, wherein the priority context includes the transmission type of the message, wherein the method further comprises at least one of:
- determining that the message is the latency-critical message based on the transmission type being a unicast message, and
- determining that the message is the latency-non-critical message based on the transmission type being a multicast message or a broadcast message.

25. The method of claim 19, wherein the priority context includes the network role of the device, wherein the method further comprises at least one of:
- determining that the message is the latency-critical message based on the network role being a router device; and
- determining that the message is the latency non-critical message based on the network role being an end device.

26. The method of claim 19, wherein the priority context includes the quality of the network communication link associated with the device, wherein the method further comprises at least one of:
- determining that the message is the latency-critical message based on the quality of the network communication link being below a threshold, and
- determining that the message is the latency non-critical message based on the quality of the network communication link being above the threshold.

* * * * *